US009836086B2

(12) United States Patent
Suckle et al.

(10) Patent No.: US 9,836,086 B2
(45) Date of Patent: Dec. 5, 2017

(54) ADJUSTABLE DOCKING STAND WITH EJECTOR AND METHOD OF PROVIDING AND USING THE SAME

(71) Applicant: Belkin International, Inc., Playa Vista, CA (US)

(72) Inventors: Mitchell Suckle, Long Beach, CA (US); John F. Wadsworth, Burbank, CA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 0 days.

(21) Appl. No.: 15/428,768

(22) Filed: Feb. 9, 2017

(65) Prior Publication Data

US 2017/0153667 A1    Jun. 1, 2017

Related U.S. Application Data

(63) Continuation-in-part of application No. 15/247,540, filed on Aug. 25, 2016, which is a continuation of application No. 14/450,019, filed on Aug. 1, 2014, now Pat. No. 9,454,183.

(60) Provisional application No. 61/861,787, filed on Aug. 2, 2013.

(51) Int. Cl.
G06F 1/16 (2006.01)

(52) U.S. Cl.
CPC .................................. *G06F 1/1632* (2013.01)

(58) Field of Classification Search
None
See application file for complete search history.

(56) References Cited

U.S. PATENT DOCUMENTS

| 4,426,122 | A | 1/1984 | Lainez |
| 5,323,291 | A | 6/1994 | Boyle et al. |
| 5,933,321 | A | 8/1999 | Ruch et al. |
| 6,069,790 | A | 5/2000 | Howell et al. |
| 6,193,546 | B1 | 2/2001 | Sadler |
| 6,290,534 | B1 | 9/2001 | Sadler |
| 6,533,599 | B1 | 3/2003 | Singleton, Jr. |
| 6,560,101 | B1 | 5/2003 | Oross et al. |
| 6,716,058 | B2 | 4/2004 | Youn |
| 6,898,080 | B2 | 5/2005 | Yin |
| 7,014,486 | B1 | 3/2006 | Wu |
| 7,066,752 | B2 | 6/2006 | Hsu |
| 7,385,807 | B1 | 6/2008 | Chuang |
| 7,524,197 | B2 | 4/2009 | Mills et al. |
| 7,538,792 | B2 | 5/2009 | Takahashi |
| 7,719,830 | B2 | 5/2010 | Howarth et al. |

(Continued)

OTHER PUBLICATIONS

International Search Report and Written Opinion for PCT/US2014/049479 dated Nov. 27, 2014 Nov. 27, 2014.

*Primary Examiner* — Xanthia C Cunningham
(74) *Attorney, Agent, or Firm* — Bryan Cave LLP

(57) ABSTRACT

A charging stand including a connector base. The charging stand also can include a docking connector pivotally coupled to the connector base and configured to be removably coupled to an electronic device. The charging stand additionally can include an ejector at least partially surrounding the docking connector and configured to push the electronic device at least partially off the docking connector when the docking connector is rotated in a first direction relative to the connector base. Other embodiments are provided.

20 Claims, 26 Drawing Sheets

(56) References Cited

U.S. PATENT DOCUMENTS

| | | |
|---|---|---|
| 7,733,643 B1 | 6/2010 | Rumpf |
| 7,931,494 B2 | 4/2011 | Long |
| 7,933,117 B2 | 4/2011 | Howarth et al. |
| 8,241,050 B2 | 8/2012 | Xu |
| 8,559,172 B2 | 10/2013 | Byrne |
| 8,568,154 B2 | 10/2013 | Chang |
| 8,721,356 B2 | 5/2014 | Webb |
| 8,780,546 B2 | 7/2014 | Zhou |
| 8,780,547 B2 | 7/2014 | Nakanishi |
| 8,929,059 B2 | 1/2015 | Anwei |
| 8,986,029 B2 | 3/2015 | Webb |
| 9,003,626 B2 | 4/2015 | Carnevali |
| 2006/0250764 A1 | 11/2006 | Howarth |
| 2007/0073952 A1 | 3/2007 | Tsai |
| 2007/0153463 A1 | 7/2007 | Choi |
| 2007/0297130 A1 | 12/2007 | Fan |
| 2008/0089547 A1 | 4/2008 | Young |
| 2008/0137285 A1 | 6/2008 | Chuang |
| 2008/0166896 A1 | 7/2008 | Choi |
| 2008/0239658 A1* | 10/2008 | Chou ............... G06F 1/1632 361/679.38 |
| 2008/0259550 A1 | 10/2008 | Lien |
| 2008/0266783 A1 | 10/2008 | Mills et al. |
| 2009/0009957 A1 | 1/2009 | Crooijmans |
| 2009/0129010 A1 | 5/2009 | Park |
| 2009/0213536 A1 | 8/2009 | Lewandowski |
| 2010/0062615 A1 | 3/2010 | Prest |
| 2010/0118485 A1 | 5/2010 | Crooijmans et al. |
| 2010/0149748 A1 | 6/2010 | Lam |
| 2012/0264329 A1 | 10/2012 | Hayashida et al. |
| 2013/0021164 A1 | 1/2013 | Heaton |
| 2013/0058036 A1 | 3/2013 | Holzer |
| 2013/0162527 A1 | 6/2013 | Dahl |
| 2013/0163186 A1 | 6/2013 | Mizusawa |
| 2013/0170131 A1 | 7/2013 | Yen |
| 2013/0173035 A1 | 7/2013 | Fadell et al. |
| 2014/0101720 A1 | 4/2014 | Xie |
| 2014/0118923 A1 | 5/2014 | Stanley |

\* cited by examiner

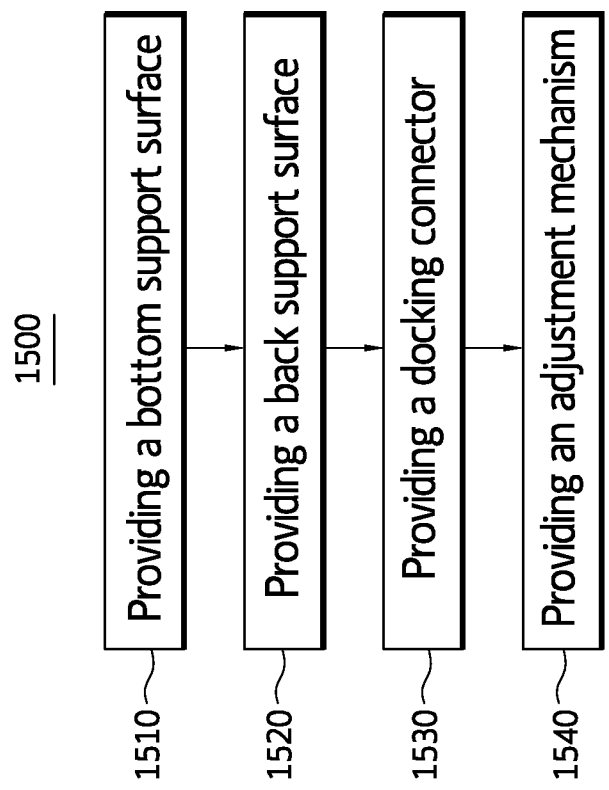

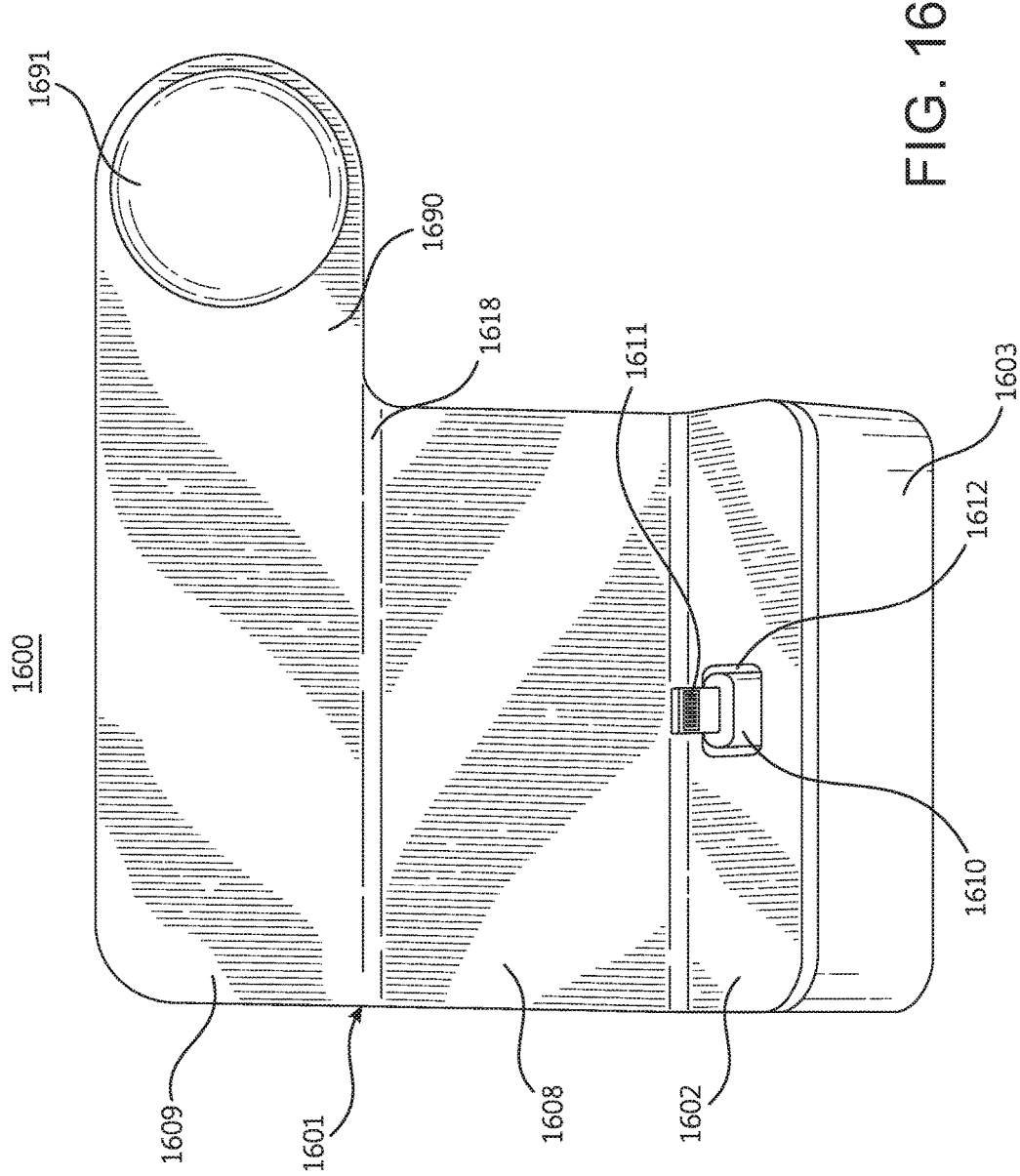

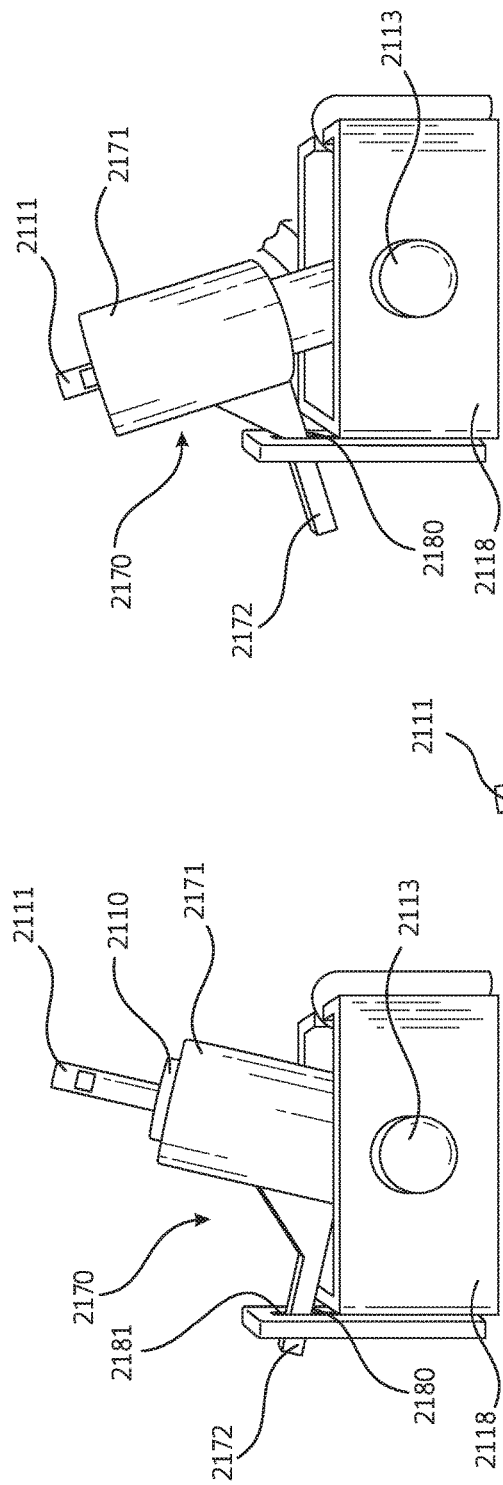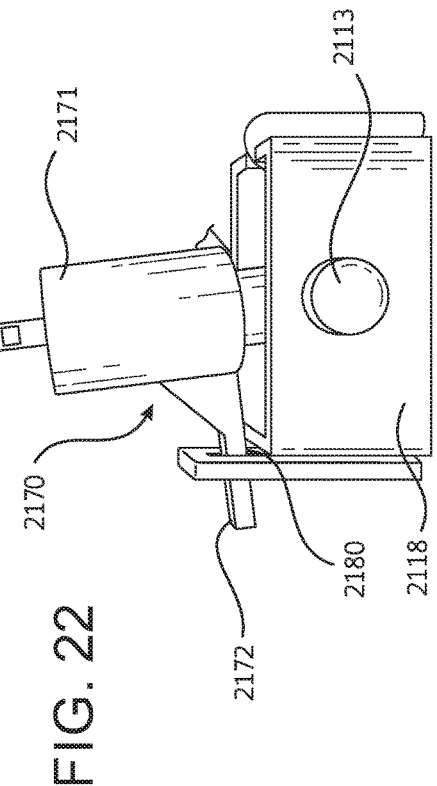

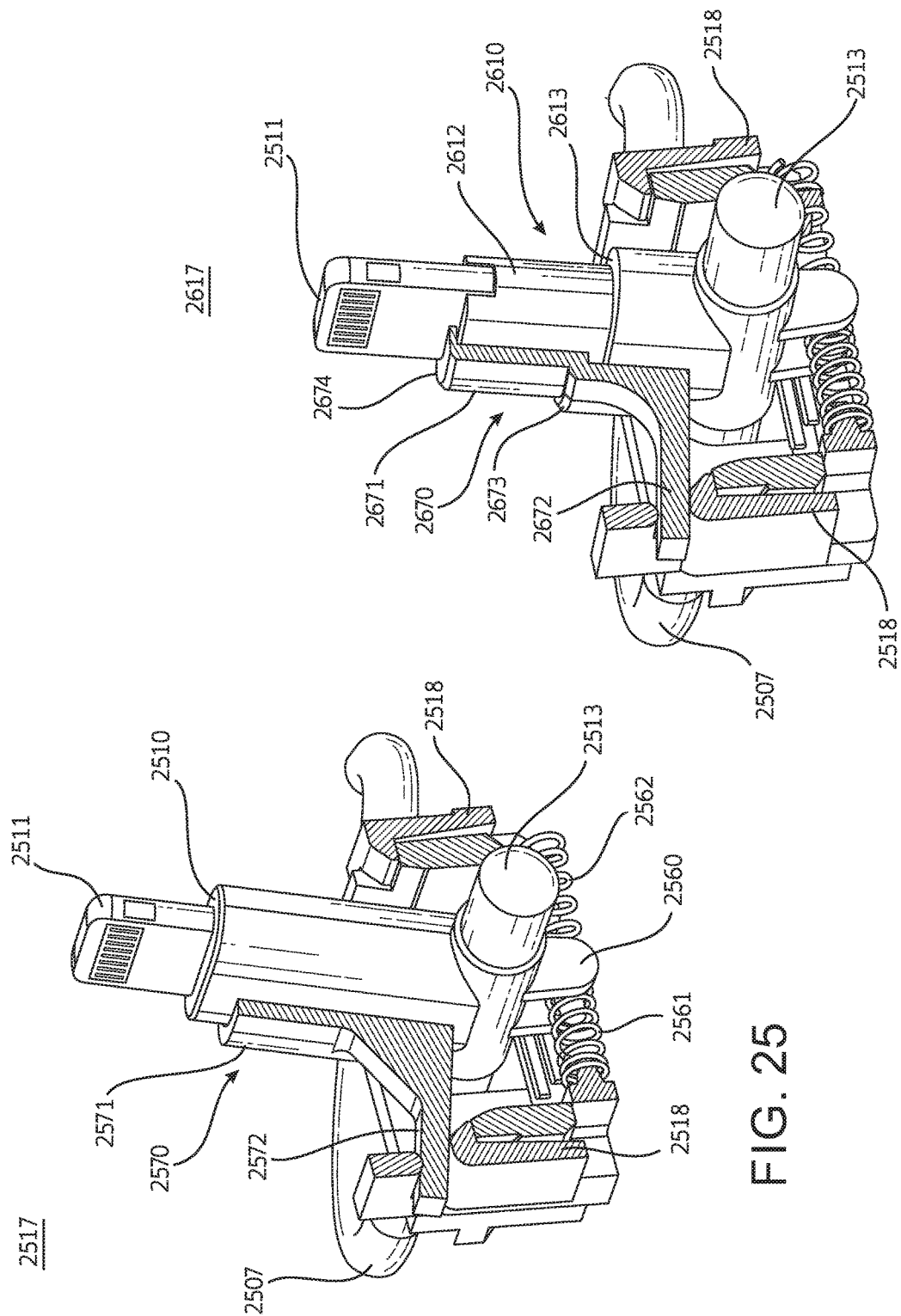

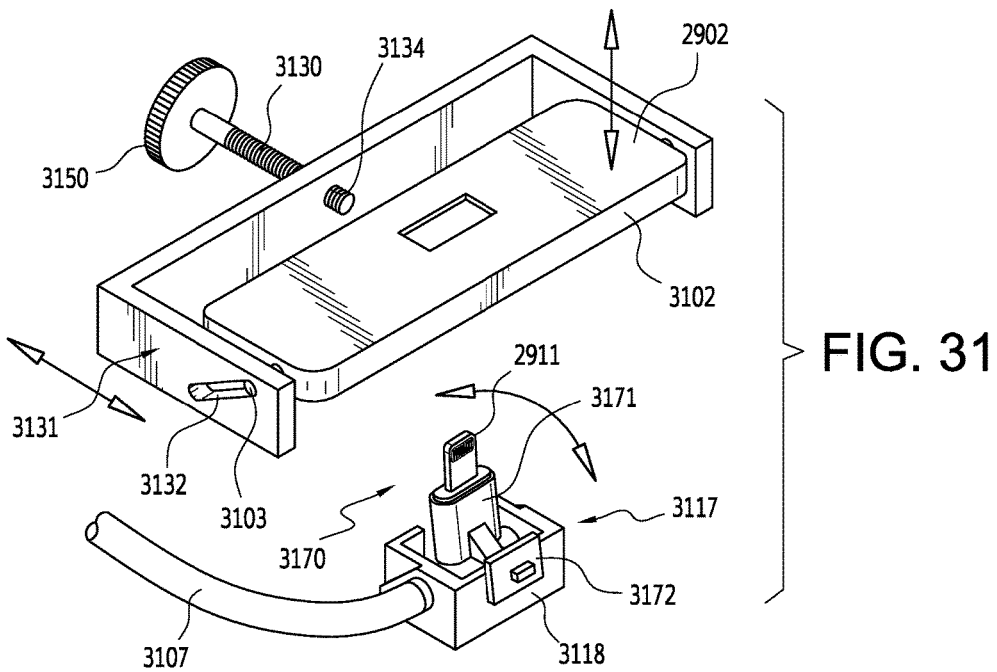
FIG. 31
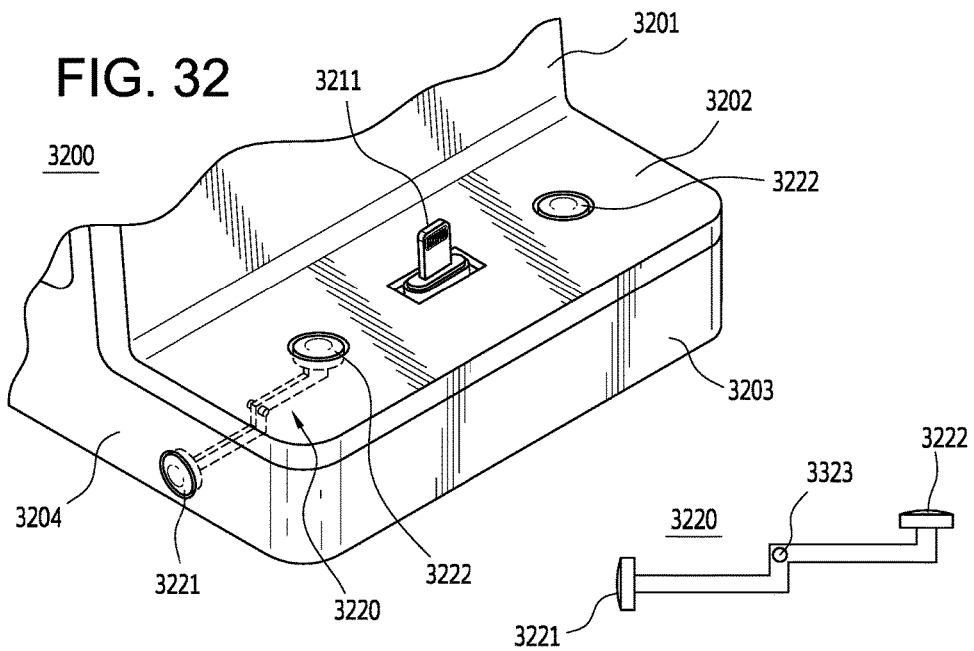
FIG. 32
FIG. 33

ADJUSTABLE DOCKING STAND WITH EJECTOR AND METHOD OF PROVIDING AND USING THE SAME

CROSS-REFERENCE TO RELATED APPLICATIONS

This application is a continuation-in-part of U.S. patent application Ser. No. 15/247,540, filed Aug. 25, 2016, which is a continuation of U.S. patent application Ser. No. 14/450, 019, filed Aug. 1, 2014, which claims the benefit of U.S. Provisional Application No. 61/861,787, filed Aug. 2, 2013. U.S. patent application Ser. Nos. 15/247,540 and 14/450, 019, and U.S. Provisional Application No. 61/861,787 are incorporated herein by reference in their entirety.

TECHNICAL FIELD

This disclosure relates generally to docking stations for electrical devices, and relates more particularly to adjustable docking stands for mobile devices.

BACKGROUND

There exist today many types and styles of mobile electronic devices, such as smartphones, tablet computing devices, media players (e.g., music players and/or video players), etc., which can come in various shapes and/or sizes. Many of these mobile devices include docking ports that can interface with docking stands, and which can allow the mobile device to be readily connected to a power source and/or other peripheral devices. These docking ports can be at different locations on the various different mobile devices. Mobile devices are often used with device cases and/or skins.

BRIEF DESCRIPTION OF THE DRAWINGS

To facilitate further description of the embodiments, the following drawings are provided in which:

FIG. 15 illustrates a flow chart for a method of providing a docking stand for an electronic device, according to an embodiment;

FIG. 16 illustrates a front, top view of an adjustable mobile-device docking stand, according to another embodiment;

FIG. 22 illustrates a right side view of the connector assembly of FIG. 21 with the docking connector of FIG. 21 in a neutral pivot position;

FIG. 23 illustrates a right side view of the connector assembly of FIG. 21 with the docking connector of FIG. 21 rotated frontward from the neutral pivot position;

FIG. 24 illustrates a right side view of the connector assembly of FIG. 21 with the docking connector of FIG. 21 rotated further frontward from the neutral pivot position;

FIG. 25 illustrates a front, top, right side perspective view of a partial cross-section of a connector assembly having an ejector with a sleeve that is devoid of a step, according to another embodiment;

FIG. 26 illustrates a front, top, right side perspective view of a partial cross-section of a connector assembly having an ejector with a sleeve that includes steps, according to another embodiment;

FIG. 31 illustrates an exploded front, top, left side perspective view of various components of the adjustable mobile-device docking stand of FIG. 30, including a floor adjustment sled and a connector assembly;

FIG. 32 illustrates a front, top, left side perspective view of an adjustable mobile-device docking stand with a side ejector, according to another embodiment;

FIG. 33 illustrates a front view of the side ejector of FIG. 32;

Figure 1:
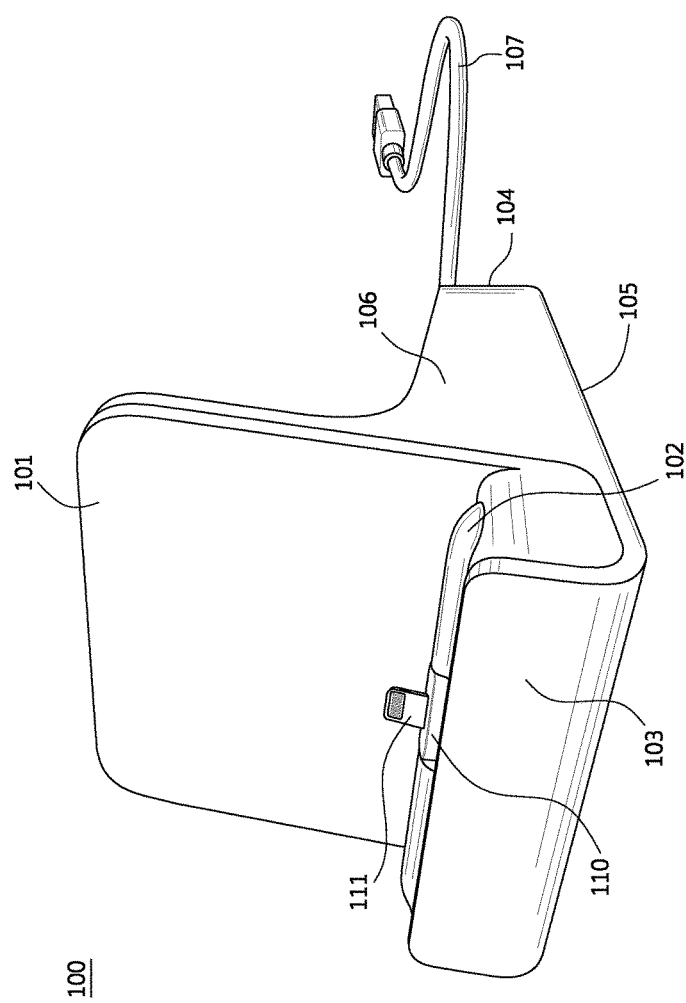
FIG. 1 illustrates a front, top, right side isometric view of an adjustable mobile-device docking stand, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable. "Mechanical coupling" and the like should be broadly understood and include mechanical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a docking stand for an electronic device. The docking stand can include a bottom support surface configured to support a bottom side of the electronic device. The docking stand also can include a back support surface configured to support a side of the electronic device. The back support surface can be substantially upright when a base of the docking stand is placed on a substantially horizontal surface. The docking stand further can include a docking connector configured to removably attach to a docking port of the electronic device. The docking port can be proximate to the bottom side of the electronic device. The docking stand also can include an adjustment mechanism configured to adjust a height of the docking connector relative to the bottom support surface.

A number of embodiments include a docking stand for an electronic device. The docking stand can include a bottom support surface configured to support a bottom side of the electronic device. The docking stand also can include a back support surface configured to support a face of the electronic device. The back support surface can be substantially upright when a base of the docking stand is placed on a substantially horizontal surface. The docking stand further can include a docking connector configured to removably attach to a docking port of the electronic device proximate to the bottom side of the electronic device. The docking connector can be configured to pivot frontward and rearward relative to the back support surface. The docking stand can be configured to support the docking connector in a substantially vertical configuration when the docking connector is detached from the docking port of the electronic device.

Several embodiments include a method of providing a docking stand for an electronic device. The method can include providing a bottom support surface configured to support a bottom side of the electronic device. The method also can include providing a back support surface configured to support a side of the electronic device. The back support surface can be substantially upright when a base of the docking stand is placed on a substantially horizontal surface. The method further can include providing a docking connector configured to removably attach to a docking port of the electronic device. The docking port can be proximate to the bottom side of the electronic device. The method also can include providing an adjustment mechanism configured to adjust a height of the docking connector relative to the bottom support surface.

Embodiments of an adjustable mobile-device docking stand can include a docking connector configured to be adjustable to various different positions. In some embodiments, the docking connector can be adjusted so as to be raised and lowered. The various different possible positions of the docking connector can allow the adjustable mobile-device docking stand to be used by various different mobile-devices and/or mobile-devices in various different cases with various different thicknesses. In certain embodiments, the adjustable mobile-device docking stand can be configured so as to hold the docking connector in a default upright position, which can facilitate for ease of docking the mobile device. In a number of embodiments, the adjustable mobile-device docking stand can be configured so as to allow the docking connector to pivot frontward and rearward.

Additional embodiments include a charging stand including a connector base. The charging stand also can include a docking connector pivotally coupled to the connector base and configured to be removably coupled to an electronic device. The charging stand additionally can include an ejector at least partially surrounding the docking connector and configured to push the electronic device at least partially off the docking connector when the docking connector is rotated in a first direction relative to the connector base.

Further embodiments include a method of providing a charging stand. The method can include providing a connector base. The method also can include providing a docking connector pivotally coupled to the connector base and configured to be removably coupled to an electronic device. The method additionally can include providing an ejector at least partially surrounding the docking connector and configured to push the electronic device at least partially off the docking connector when the docking connector is rotated in a first direction relative to the connector base.

Figure 2:
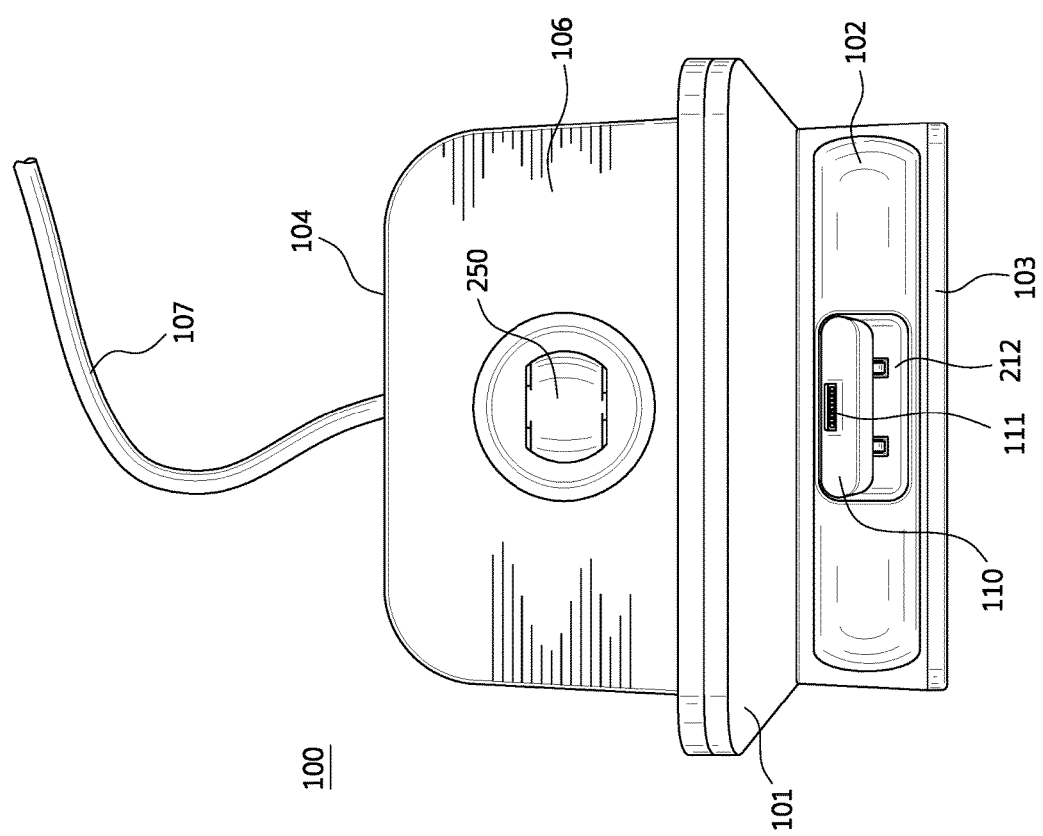
FIG. 2 illustrates a top plan view of the adjustable mobile-device docking stand of FIG. 1.

Turning to the drawings, FIG. 1 illustrates a front, top, right side isometric view of an adjustable mobile-device docking stand 100. FIG. 2 illustrates a top plan view of adjustable mobile-device docking stand 100. Adjustable mobile-device docking stand 100 is merely exemplary, and embodiments of the adjustable mobile-device docking stand are not limited to embodiments presented herein. The adjustable mobile-device docking stand can be employed in many different embodiments or examples not specifically depicted or described herein. In a number of embodiments, adjustable mobile-device docking stand 100 can include a back support surface 101, a bottom support surface 102, a front 103, and/or a rear 104. In many embodiments, adjustable mobile-device docking stand 100 can include a stand base 105, a rear portion 106, and/or a stand cable 107. In some embodiments, adjustable mobile-device docking stand 100 can include a connector assembly 110. Connector assembly 110 can include a docking connector 111. In certain embodiments, adjustable mobile-device docking stand 100 can include a connector well 212, and connector assembly 110 can be located partially or fully within connector well 212. In some embodiments, bottom support surface 102 can include connector well 212. In a number of embodiments, connector assembly 110, docking connector 111, and/or connector well 212 can be located at bottom support surface 102, and in many embodiments, can be centered on bottom support surface 102 between the sides of adjustable mobile-device docking stand 100. Various components of adjustable mobile-device docking stand 100 can be made of a suitable rigid polymer (e.g., polycarbonate (PC, or acrylonitrile butadiene styrene (ABS)), metal, and/or ceramic material.

Docking connector 111 can be configured to connect with and/or removably attach to a docking port of a mobile device. For example, docking connector 111 can be a 30-pin dock connector, which is compatible with the iPhone 4 (and previous generations), the iPod Touch (4th generation and previous generations), the iPod Nano (6th generation and previous generations), and the iPad 3 (and previous generations), developed and sold by Apple, Inc., of Cupertino, Calif., among other devices. As another example, docking connector 111 can be a 8-pin Lightning connector, which is compatible with the iPhone 5, the iPod touch (5th generation), the iPad Nano (7th generation), and the iPad 4, developed and sold by Apple, Inc., among other devices. Docking connector 111 can be another suitable docking connector for connecting adjustable mobile-device docking stand 100 to the docking port of a mobile device. The docking port can be proximate to the bottom side of the electronic device. In some embodiments, when the mobile device is connected to docking connector 111, the bottom of the mobile device can rest upon bottom support surface 102 and/or connector assembly 110.

In many embodiments, stand base 105 can have a sufficient dimension to prevent adjustable mobile-device docking stand 100 from tipping over when a mobile device is docked to docking connector 111. In some embodiments, stand base 105 can have a substantially rectangular shape, a substantially circular shape, a rounded rectangular shape, or another suitable shape for providing a support base for adjustable mobile-device docking stand 100. In a number of embodiments, a dimension of stand base 105 from side to side and/or a dimension of stand base 105 from front 103 to back 104 can be between approximately 3 inches (in) (7.62 centimeter (cm)) and approximately 5 in (12.7 cm).

In some embodiments, back support surface 101 can be substantially planar. When adjustable mobile-device docking stand 100 is placed on stand base 105 on a substantially horizontal surface, back support surface 101 can be substantially upright, such as substantially vertical and/or angled slightly rearward from vertical, so as to allow the back of the mobile device to be supported by back support surface 101. Back support surface 101 can support a side (e.g., a rear side) of the mobile device. Bottom support surface 102 can be substantially horizontal, or can be angled such that the rear portion of bottom support surface 102 is lower than the front portion of bottom support surface 102 when adjustable mobile-device docking stand 100 is placed on stand base 105 of a substantially horizontal surface. Bottom support surface 102 can support a bottom side of the mobile device.

Such an angle can allow the mobile device, when docked to docking connector 111, to be angled rearward from vertical, so as to allow the back of the mobile device to be support by back support surface 101. In certain embodiments, such as adjustable mobile-device docking stand 100 shown in FIGS. 1-2, bottom support surface 102 can be curved convexly relative to docking stand 100 so as to protrude upward, which can facilitate docking to docking connector 111 of various mobile devices, such as for mobile device with docking ports above the bottom of the mobile devices or for mobile devices held by a mobile-device case.

In many embodiments, adjustable mobile-device docking stand 100 can include a stand cable 107. Stand cable 107 can be electrically coupled to docking connector 111. In some embodiments, stand cable 107 can extend from rear 104, and allow adjustable mobile-device docking stand 100 and/or the mobile device to be connected to one or more external resources or peripheral devices, such as a power source, a video display, a stereo system, a computer, a keyboard, an alarm clock, and/or other suitable resources or peripheral devices. For example, stand cable 107 can be a universal serial bus (USB) cable with a USB plug, which can connect to a computer.

Adjustable mobile-device docking stand 100 can include an adjustment mechanism, such as adjustment wheel 250. In certain embodiments, rear portion 106 can include adjustment wheel 250. Adjustment wheel 250 can be used to raise and lower, or to otherwise adjust, docking connector 111 and/or connector assembly 110 with respect to bottom support surface 102 and/or adjustable mobile-device docking stand 100. In other embodiments, adjustment wheel 250 can be another suitable adjustment mechanism, such as an adjustment slider, an adjustment button, or another suitable adjustment mechanism. In many embodiments, the adjustment mechanism, such as adjustment wheel 250, can be located at rear portion 106 of adjustable mobile-device docking stand 100 behind back support surface 101.

Figure 3:
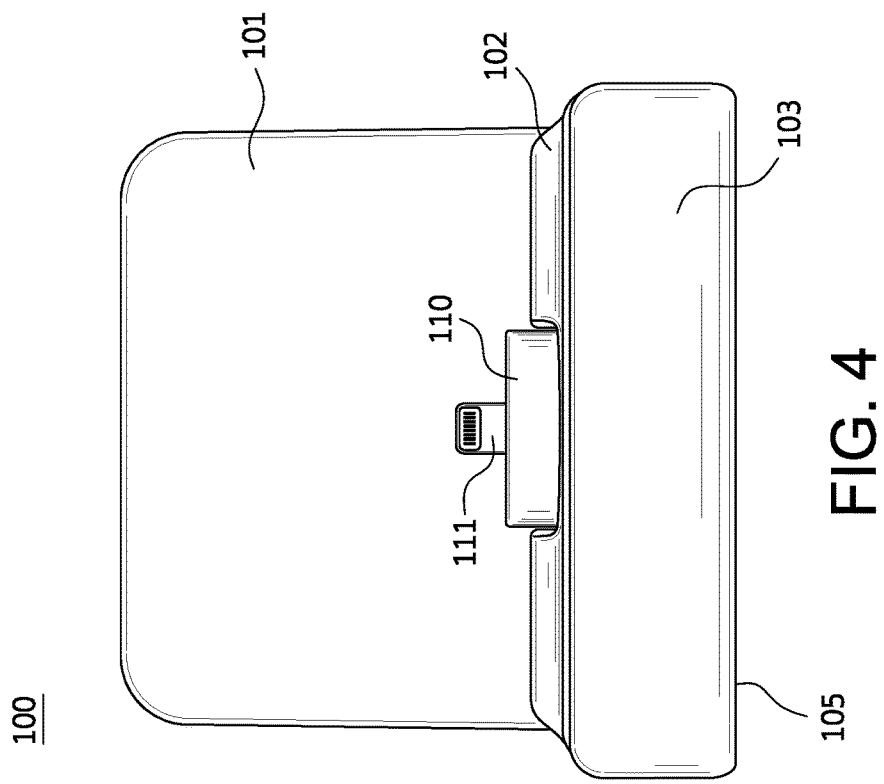
FIG. 3 illustrates a front elevational view of the adjustable mobile-device docking stand of FIG. 1 with a docking connector in a lowered position.
Figure 4:
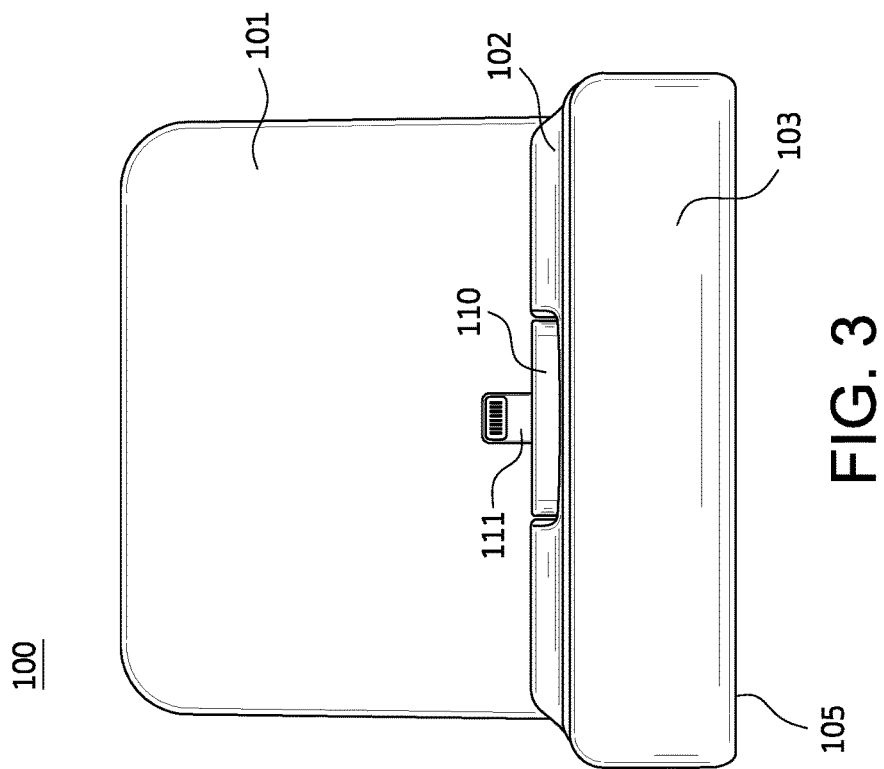
FIG. 4 illustrates a front elevational view of the adjustable mobile-device docking stand of FIG. 1 with the docking connector in a raised position.

Turning ahead in the drawings, FIG. 3 illustrates a front elevational view of adjustable mobile-device docking stand 100 with docking connector 111 in a lowered position. FIG. 4 illustrates a front elevational view of adjustable mobile-device docking stand 100 with docking connector 111 in a raised position. As shown in FIGS. 3-4, connector assembly 110 and docking connector 111 can be adjusted, such as raised and lowered. For example, in one position, a top of connector assembly 110 can be substantially parallel with a top of bottom support surface 102, as shown in FIG. 3. In another position, a top of connector assembly 110 can be substantially higher than a top of bottom support surface 102, as shown in FIG. 4. In yet another position, a top of connector assembly 110 can be substantially lower than a top of bottom support surface 102. In certain embodiments, connector assembly 110 and/or docking connector 111 can be raised and/or lowered with respect to bottom support surface 102 such that the highest position is at least 5 millimeters (mm) higher than the lowest position. In other embodiments, the highest position of connector assembly and/or docking connector 111 can be at least 10, 15, 20, 25, or 30 mm higher than the lowest position.

Figure 6:
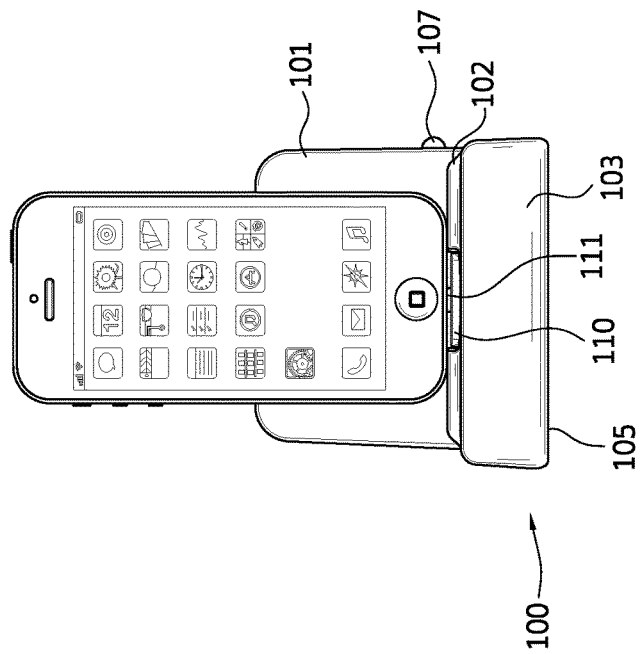
FIG. 6 illustrates a front elevational view of the adjustable mobile-device docking stand of FIG. 1 with the docking connector connected to a smartphone.
Figure 5:
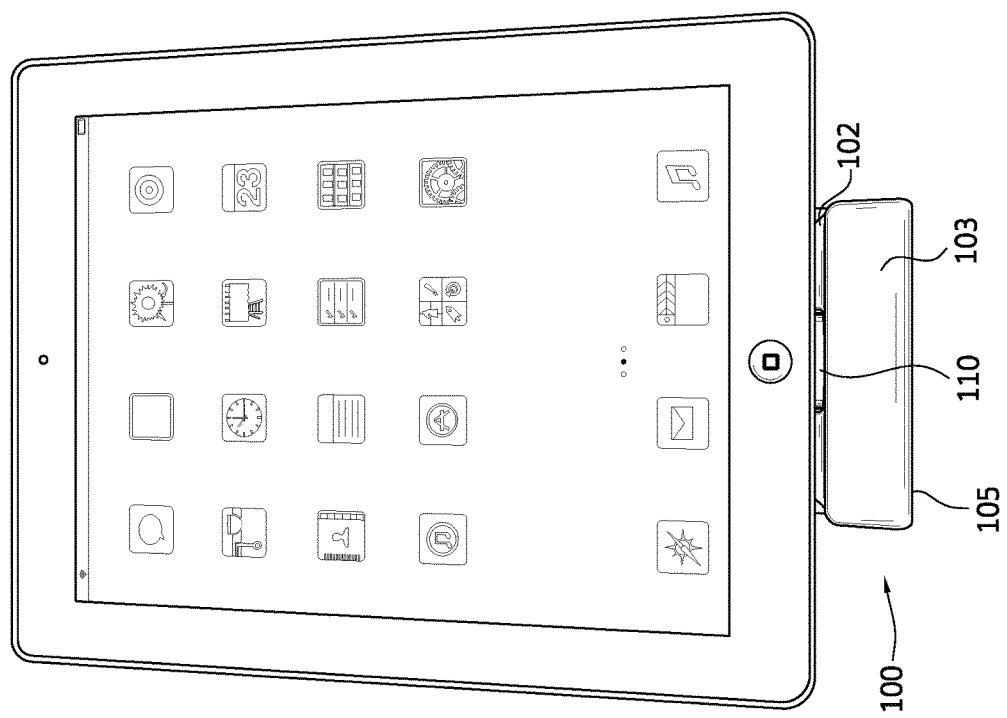
FIG. 5 illustrates a front elevational view of the adjustable mobile-device docking stand of FIG. 1 with the docking connector connected to a tablet computing device.

Turning ahead in the drawings, FIG. 5 illustrates a front elevational view of adjustable mobile-device docking stand 100 with docking connector 111 connected to an iPad 4. FIG. 6 illustrates a front elevational view of adjustable mobile-device docking stand 100 with docking connector 111 connected to an iPhone 5. For certain mobile devices, such as the iPad 4, the bottom of the mobile device extends below the opening for the docking port. For other mobile devices, such as the iPhone 5, the opening for the docking port is located on a bottom of the mobile device. In some embodiments, adjustable mobile-device docking stand 100 can be advantageously configured such that connector assembly 110 and/or docking connector 111 (not shown in FIG. 5) can be raised to connect with a mobile device having a docking port located above the bottom of the mobile device, such as the iPad 4, as shown in FIG. 5, and lowered to connect with a mobile device having a docking port located at the bottom of the mobile device, such as the iPhone 5, as shown in FIG. 6.

A wide variety of cases for mobile devices have been produced. Many of these cases include slots, openings, or apertures for the mobile device's docking port that allow the mobile device to be connected to a docking connector when the mobile device is held by the case. Many of these cases have varying thicknesses. In addition, certain cases can have protrusions or other undulations surrounding the slot for the docking port. In a number of embodiments, adjustable mobile-device docking stand 100 can be advantageously configured such that connector assembly 110 and/or docking connector 111 can be raised to connect with a mobile device inside a case having a thicker bottom portion, or lowered to connect with a mobile device inside a case having a thinner bottom portion.

Figure 7:
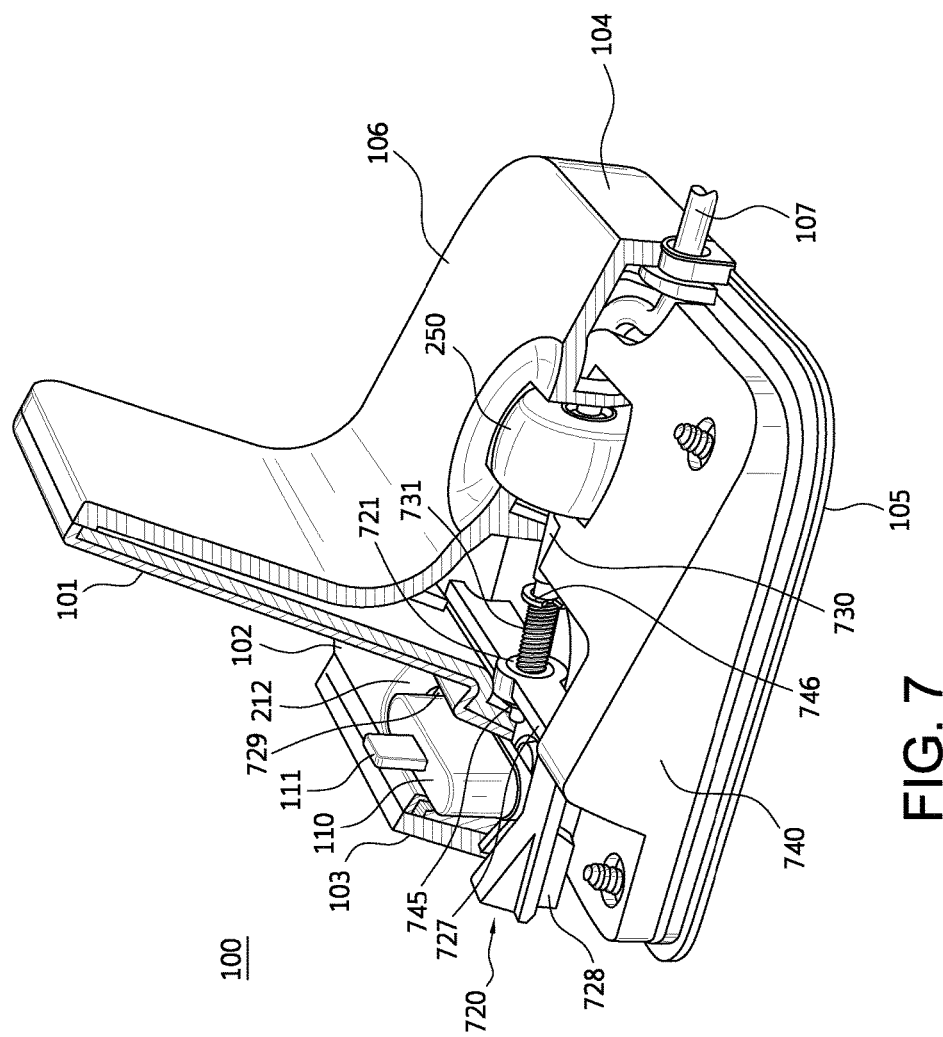
FIG. 7 illustrates a rear, top, right side cut-away isometric view of the adjustable mobile-device docking stand of FIG. 1.

Turning ahead in the drawings, FIG. 7 illustrates a rear, top, right side cut-away isometric view of adjustable mobile-device docking stand 100. In some embodiments, adjustable mobile-device docking stand 100 can include an adjustment sled 720. Adjustment sled 720 can include central sled portion 727, right side sled portion 728, and/or left side sled portion 729. Right side sled portion 728 can be substantially parallel to left side sled portion 729, and right side sled portion 728 and/or left side sled portion 729 can be orthogonal with central sled portion 727. Adjustment sled 720 can include a threaded sled portion 721. In many embodiments, threaded sled portion 721 can be centered between the sides of central sled portion 727. In a number of embodiments, adjustable mobile-device docking stand 100 can include an axle 730. Axle 730 can include a threaded axle portion 731. In many embodiments, adjustable mobile-device docking stand 100 can include a base assembly 740. Base assembly 740 can include a front sled stop 745 and a rear sled stop 746.

Adjustment wheel 250 can be connected to axle 730, and, in many embodiments, can share a radial axis with axle 730. Threaded axle portion 731 can be threaded inside threaded sled portion 721, such that rotation of threaded axle portion 731 can cause threaded sled portion 721 to be adjusted and move frontward or rearward. In a number of embodiments, rotating adjustment wheel 250 clockwise when viewed from the front can cause adjustment sled 720 to move frontward. Further clockwise rotation of adjustment wheel 250 can cause adjustment sled 720 to move frontward until frontward adjustment is stopped by front sled stop 745. Rotating adjustment wheel counterclockwise when viewed from the front can cause adjustment sled 720 to move rearward. Further counterclockwise rotation of adjustment wheel 250 can cause adjustment sled 720 to move rearward until rearward adjustment is stopped by rear sled stop 746. In many embodiments, axle 730 can be centered between the sides of adjustable mobile-device docking stand 100.

Figure 8:
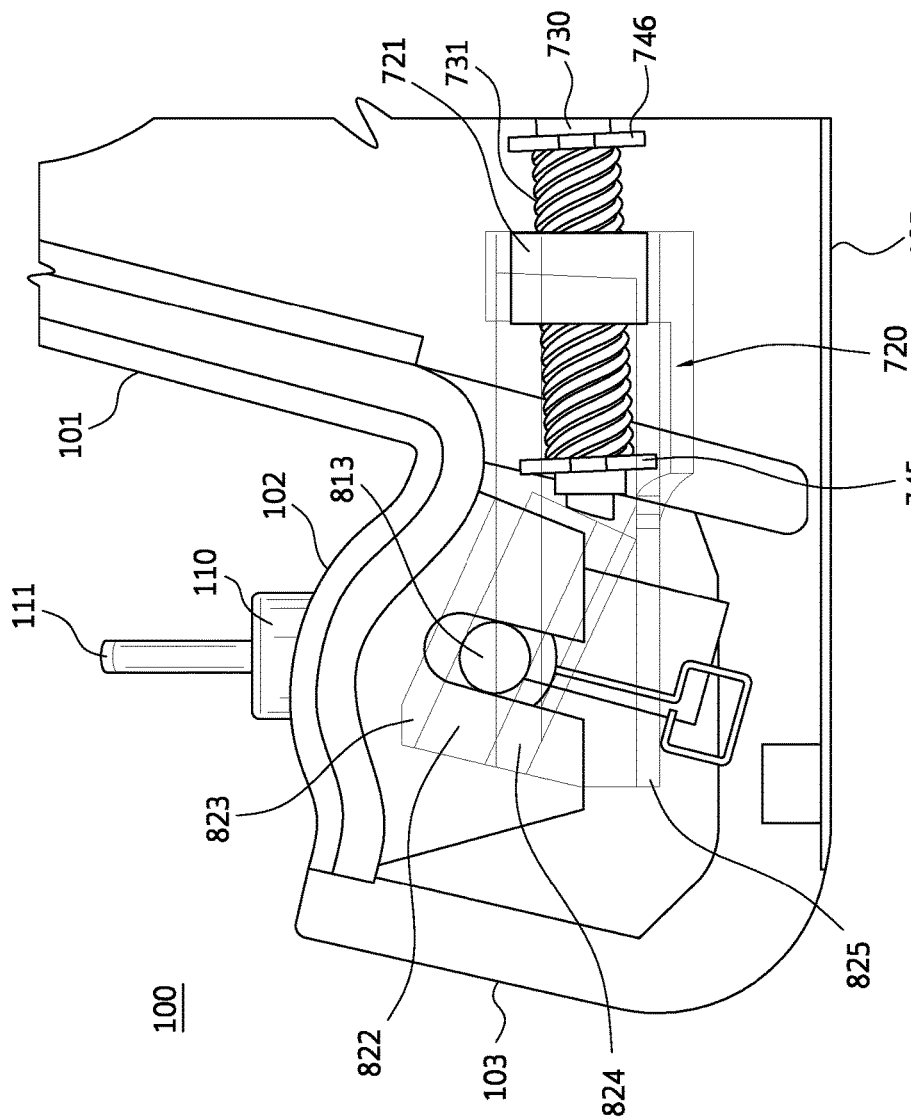
FIG. 8 illustrates a right side cross-sectional view of the adjustable mobile-device docking stand of FIG. 1, with the cross-section taken to the right of the connector assembly.
Figure 10:
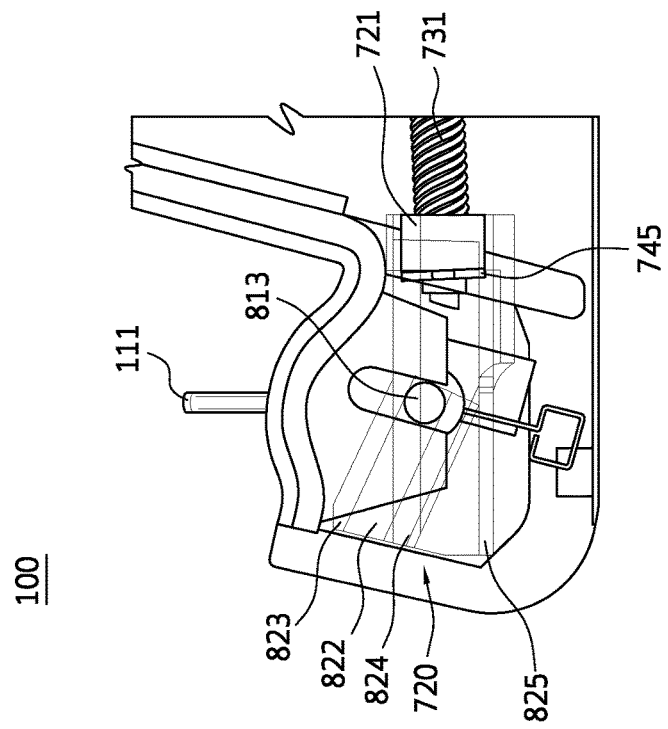
FIG. 10 illustrates a right side cross-sectional view of the adjustable mobile-device docking stand of FIG. 1, showing the docking connector in a lowered position, with the cross-section taken along cross-sectional line 10-10 in FIG. 3.
Figure 9:
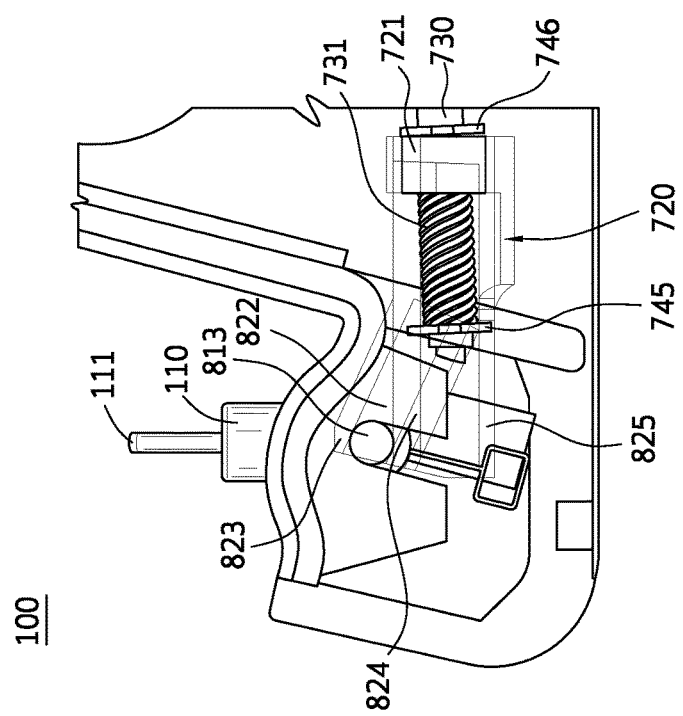
FIG. 9 illustrates a right side cross-sectional view of the adjustable mobile-device docking stand of FIG. 1, showing the docking connector in a raised position, with the cross-section taken along cross-sectional line 9-9 in FIG. 4.
Figure 11:
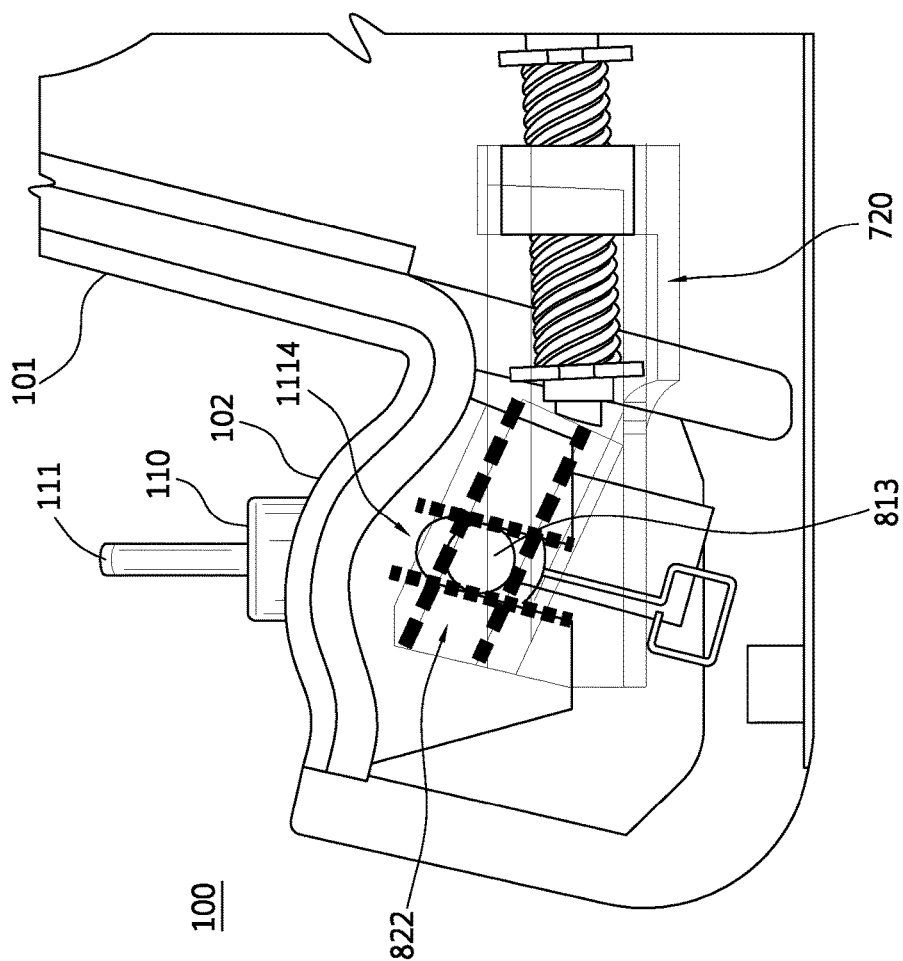
FIG. 11 illustrates a right side cross-sectional view of the adjustable mobile-device docking stand of FIG. 1, showing adjustment channels of the adjustable mobile-device docking stand, with the cross-section taken to the right of the connector assembly.

Turning ahead in the drawings, FIG. 8 illustrates a right side cross-sectional view of adjustable mobile-device docking stand 100, with the cross-section taken to the right of connector assembly 110. FIG. 9 illustrates a right side cross-sectional view of adjustable mobile-device docking stand 100, showing docking connector 111 in a raised position, with the cross-section taken along cross-sectional line 9-9 in FIG. 4. FIG. 10 illustrates a right side cross-sectional view of adjustable mobile-device docking stand 100, showing docking connector 111 in a lowered position, with the cross-section taken along cross-sectional line 10-10 in FIG. 3. FIG. 11 illustrates a right side cross-sectional view of adjustable mobile-device docking stand 100, showing adjustment channels of adjustable mobile-device docking stand 100, with the cross-section taken to the right of connector assembly 110. In many embodiments, right side portion 728 (FIG. 7) and/or left side portion 729 (FIG. 7) of adjustment sled 720 can include a sled alignment portion 825. In certain embodiments, sled alignment portion 825 can include one or more rails or grooves than can engage with base assembly 740 (FIG. 7). Sled alignment portion 825 can be configured to align the adjustment of adjustment sled 720 such that adjustment sled 720 can slide can be adjusted frontward and rearward, and such that the movement of adjustment sled 720 is substantially horizontal in a frontward/rearward direction when adjustable mobile-device docking stand 100 is placed on a substantially horizontal surface. In many embodiments, adjustment of adjustment wheel 250 can move adjustment sled 720 substantially parallel with stand base 105. In a number of embodiments, right side portion 728 (FIG. 7) and/or left side portion 729 (FIG. 7) of adjustment sled 720 can include a sled channel 822 between a sled channel top 823 and a sled channel bottom 824. Connector assembly 110 can include a connector assembly pivot 813 on one or both sides of connector assembly 110. In many embodiments, connector assembly pivot 813 can have a circular cross section when viewed from the side, and/or can be configured to fit within and/or slide along sled channel 822. Sled channel top 823 and/or sled channel bottom 824 can secure connector assembly pivot 813 within sled channel 822.

Figure 12:
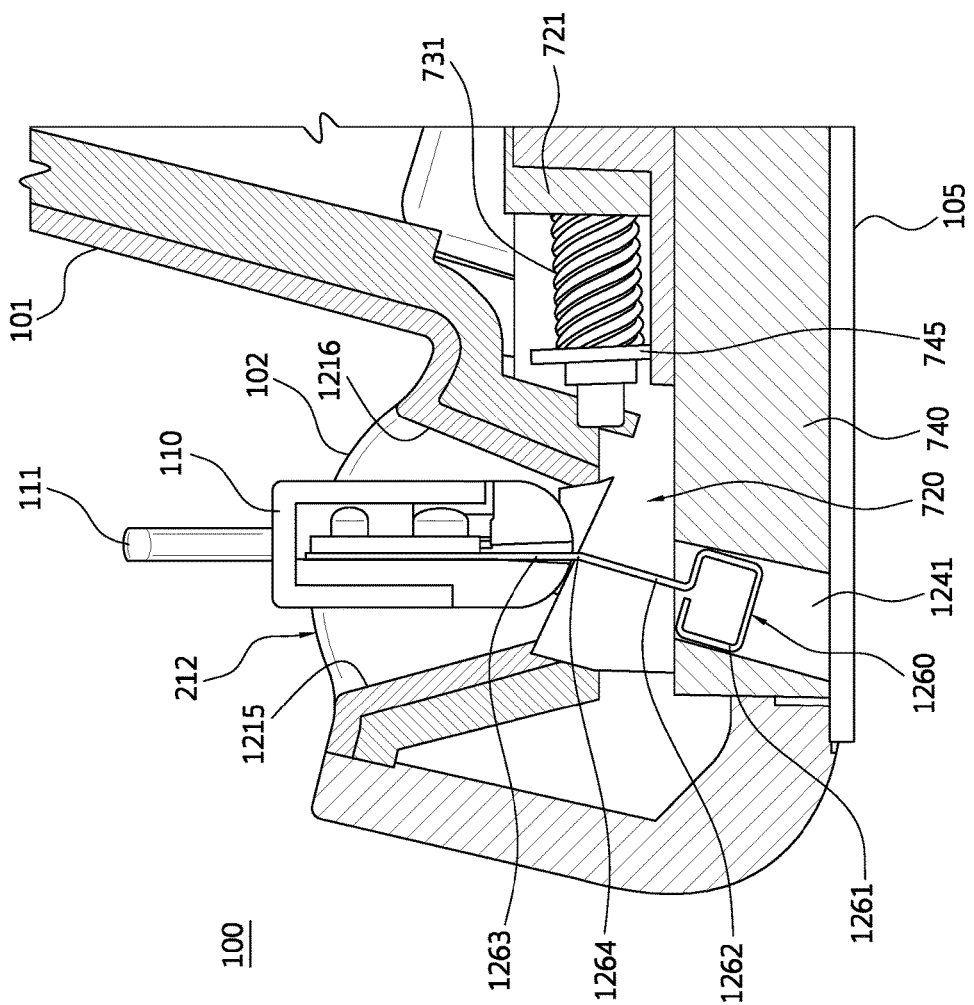
FIG. 12 illustrates a right side cross-sectional view of the adjustable mobile-device docking stand of FIG. 1, with the cross-section taken through the connector assembly and to the right of the docking connector.
Figure 14:
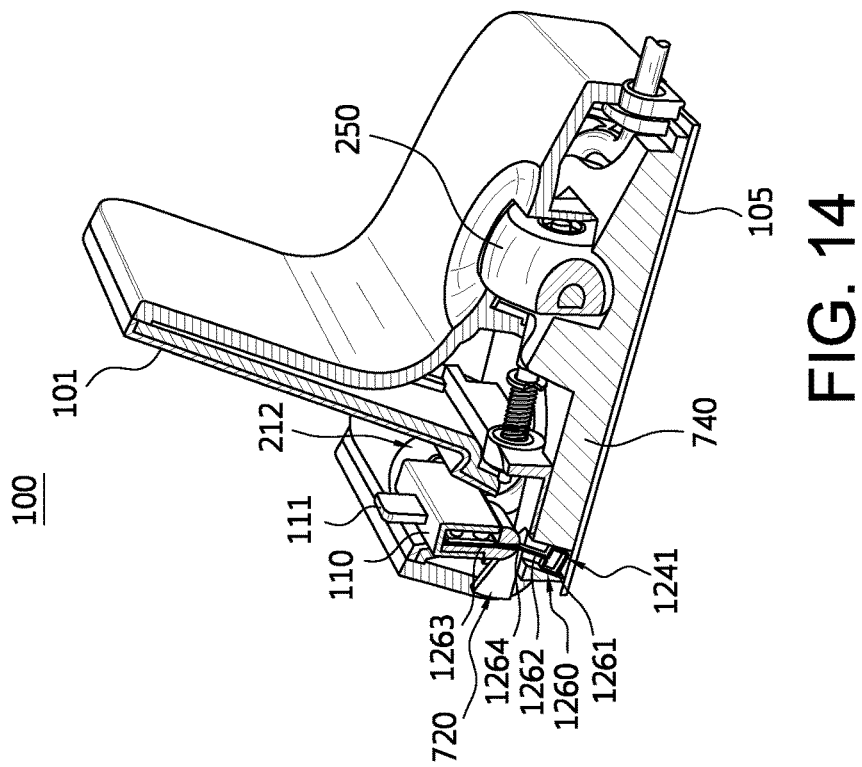
FIG. 14 illustrates a top, rear, right side isometric cross-sectional view of the adjustable mobile-device docking stand of FIG. 1, with the docking connector in a lowered position and with the cross-section taken along cross-sectional line 14-14 in FIG. 3.
Figure 13:
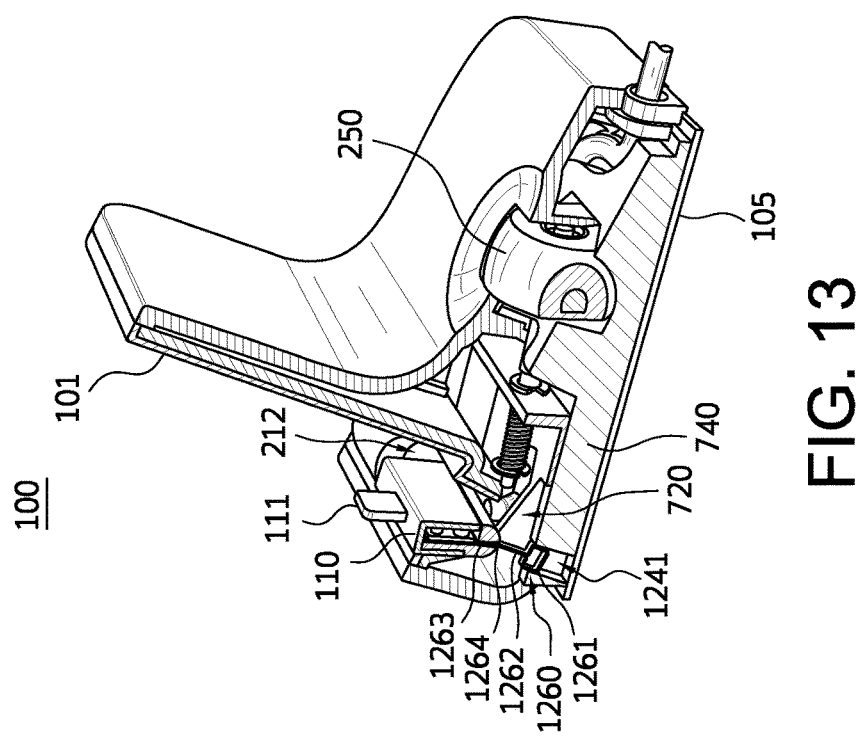
FIG. 13 illustrates a top, rear, right side isometric cross-sectional view of the adjustable mobile-device docking stand of FIG. 1, with the docking connector in a raised position and with the cross-section taken along cross-sectional line 13-13 in FIG. 4.

In several embodiments, when adjustable mobile-device docking stand 100 is placed on a substantially horizontal surface, sled channel 822 can have an angled incline toward the front of adjustable mobile-device docking stand 100, such that the front portion of sled channel 822 is located above the rear portion of sled channel 822. In many embodiments, adjustment of adjustment wheel 250 can adjust the height of connector assembly pivot 813 within sled channel 822 and/or adjust the height of connector assembly 110 and/or docking connector 111 relative to bottom support surface 102. For example, by rotating adjustment wheel 250 such that adjustment sled 720 is moved rearward, connector assembly pivot 813 can be adjusted upward, such that connector assembly 110 and/or docking connector 111 can be raised, as shown in FIG. 9. By rotating adjustment wheel 250 such that adjustment sled 720 is moved frontward, connector assembly pivot 813 can be adjusted downward, such that connector assembly 110 and/or docking connector 111 can be lowered, as shown in FIG. 10. As emphasized in FIG. 11, as adjustment sled 720 moves frontward and rearward, sled channel 822 (shown with dashed lines) moves frontward and rearward, and connector assembly pivot 813, connector assembly 110, and/or docking connector 111 can be raised and/or lowered along a pivot channel 1114 (shown with dotted lines). In a number of embodiments, connector assembly pivot 813 can be retained within pivot channel 1114 by support surfaces along the dotted lines. In other embodiments, connector assembly pivot 813 can be guided along pivot channel 1114 by another mechanism, such as a spring channel, as shown in FIGS. 12-14 and described below. In many embodiments, pivot channel 1114 can be substantially parallel to back support surface 101. In other embodiments, pivot channel 1114 can be substantially vertical when adjustable mobile-device docking stand 100 is placed on a substantially horizontal surface.

Turning ahead in the drawings, FIG. 12 illustrates a right side cross-sectional view of adjustable mobile-device docking stand 100, with the cross-section taken through connector assembly 110 and to the right of docking connector 111. FIG. 13 illustrates a top, rear, right side cross-sectional isometric view of adjustable mobile-device docking stand 100, with docking connector 111 in a raised position and with the cross-section taken along cross-sectional line 13-13 in FIG. 4. FIG. 14 illustrates a top, rear, right side cross-sectional isometric view of adjustable mobile-device docking stand 100, with docking connector 111 in a lowered position and with the cross-section taken along cross-sectional line 14-14 in FIG. 3. In a number of embodiments, base assembly 740 can include a spring channel 1241. In some embodiments, spring channel 1241 can be substantially vertical. In other embodiments, spring channel 1241 can be angled rearward. For example, spring channel 1241 can be angled such that it is parallel to pivot channel 1114 (FIG. 11) and/or back support surface 101. In several embodiments, adjustable mobile-device docking stand 100 can include at least one centering spring 1260. Centering spring 1260 can include a centering spring stabilizer 1261. Centering spring stabilizer 1261 can be configured to fit within spring channel 1241 and/or can slide upward and downward within spring channel 1241. In some embodiments, centering spring 1260 can include a centering spring plate 1263, which can be connected to centering spring stabilizer 1261 by a centering spring connector 1262. In certain embodiments, centering spring 1260 can include a centering spring bend 1264. In some embodiments, centering spring bend can be located at an interface between centering spring plate 1263 and centering spring connector 1262. In a number of embodiments, centering spring plate 1263 can be connected to connector assembly 110 and/or docking connector 111. In many embodiments, centering spring plate 1263 can be substantially vertical when adjustable mobile-device docking stand 100 is placed on a substantially horizontal surface.

In many embodiments, connector assembly 110 and/or docking connector 111 is raised or lowered, such as by adjustment of adjustment sled 720, as described above, and centering spring 1260 can be raised or lowered, such that centering spring stabilizer 1261 is raised or lowered within spring channel 1241. In a number of embodiments, adjustable mobile-device docking stand 100 can support connector assembly 110 and/or docking connector 111 in a substantially vertical configuration when docking connector 111 is detached from the docking port of the electronic device, as shown in FIGS. 8-12. For example, in many embodiments, centering spring stabilizer 1261 can be of sufficient dimension so as to be able to be guided upward and downward by spring channel 1241 and/or to maintain the centering spring plate 1263, connector assembly 110, and/or docking connector 111 in a substantially vertical position. Centering spring connector 1262 can extend from centering spring stabilizer 1261 to centering spring plate 1263 and/or connector assembly 110. In some embodiments, centering spring connector 1262 can be angled such that it is parallel to spring channel 1241 and/or back support surface 101. Centering spring bend 1264 can be an angled bend in centering spring 1260, such that centering spring plate 1263, connector assembly 110, and/or docking connector 111 are substantially vertical and such that spring channel 1241 and/or centering spring connector 1262 are angled. For example, adjustment wheel 250 can be rotated clockwise when viewed from the front, which can move adjustment sled 720 rearward, and lower connector assembly pivot 813 (FIG. 8), connector assembly 110, and/or docking connector 111, and docking connector 111 can be maintained in a substantially vertical position by centering spring 1260, with centering spring stabilizer 1261 adjusting upward within spring channel 1241, as shown in FIG. 13. Similarly, adjustment wheel 250 can be rotated counterclockwise when viewed from the front, which can move adjustment sled 720 frontward, and raise connector assembly pivot 813 (FIG. 8), connector assembly 110, and/or docking connector 111, and docking connector 111 can be maintained in a substantially vertical position by centering spring 1260, with centering spring stabilizer 1261 adjusting downward within spring channel 1241, as shown in FIG. 14. In other embodiments, centering spring plate 1263, connector assembly 110, and/or docking connector 111 can be angled so as to be parallel to spring channel 1241, centering spring connector 1262, and/or back support surface 101, or can be at another suitable angle.

In some embodiments, centering spring 1260 can be made of a rigid elastic material, such as a spring steel, or another suitable material. In many embodiments, centering spring 1260 can bend elastically at centering spring bend 1264, such that centering spring plate can pivot around centering spring bend 1264. In a number of embodiments, centering spring bend can be located substantially between each side of connector assembly pivot 813 (FIG. 8). In many embodiments, centering spring 1260 can be configured to facilitate connector assembly 110 pivoting around connector assembly pivot 813 (FIG. 8) and/or centering spring bend 1264. Connector well 212 can include a connector well front wall 1215 and/or a connector well rear wall 1216. In certain embodiments, connector well 212 can be fanned out upward toward bottom support surface 102. For example, connector well front wall 1215 and connector well rear wall 1216 can be angled and/or fanned out such that the distance between the connector well front wall 1215 and connector well rear wall 1216 is greater further upward closer to bottom support surface 102 than further downward closer to stand base 105. Such angled surfaces can allow connector assembly 110 and/or docking connector 111 to pivot around connector assembly pivot 813 (FIG. 8) and extend frontward to connector well front wall 1215 and/or extend rearward to connector well rear wall 1216.

In many embodiments, connector assembly 110 and/or docking connector 111 can pivot frontward and/or rearward relative to back support surface 101. In several embodiments, centering spring 1260 can allow connector assembly 110 and/or docking connector 111 to pivot frontward and/or rearward relative to back support surface 101. In a number of embodiments, connector assembly 110 and/or docking connector 111 can be raised and/or lowered within connector well 212.

In many embodiments, when adjustable mobile-device docking stand 100 is placed on a substantially horizontal surface, centering spring 1260 can hold centering spring plate 1263, connector assembly 110, and/or docking connector 111 in a substantially vertical default position so that, when a mobile device is not connected to docking connector 111, connector assembly 110 is not being bent frontward or rearward. This default vertical position of connector assembly 110 and/or docking connector 111 can advantageously facilitate ease of docking the mobile device with docking connector 111, such that the mobile device can be docked with adjustable mobile-device docking stand 100 by simply holding the mobile device vertically over docking connector 111 and pushing the mobile device downward in a substantially vertical direction. In many embodiments, when the mobile device is connected to docking connector 111, centering spring 1260 can be configured such that the weight of the mobile device can cause centering spring plate 1263, connector assembly 110, and/or docking connector 111 to pivot rearwards such that the mobile device and or/the mobile-device case rests against and/or is supported by back support surface 101, and/or such that centering spring plate 1263, connector assembly 110, and/or docking connector 111 is substantially parallel to back support surface 101. In many embodiments, connector assembly 110 and/or docking connector 111 can have a default vertical position and/or can pivot around connector assembly pivot 813 (FIG. 8) when in a raised position, as shown in FIG. 13. In some embodiments, connector assembly 110 and/or docking connector 111 can have a default vertical position and/or can pivot around connector assembly pivot 813 (FIG. 8) when in a lowered position, as shown in FIG. 14.

Turning ahead in the drawings, FIG. 15 illustrates a flow chart for an embodiment of a method 1500 of providing a docking stand for an electronic device. Method 1500 is merely exemplary and is not limited to the embodiments presented herein. Method 1500 can be employed in many different embodiments or examples not specifically depicted or described herein. In some embodiments, the procedures, the processes, and/or the activities of method 1500 can be performed in the order presented. In other embodiments, the procedures, the processes, and/or the activities of the method 1500 can be performed in any other suitable order. In still other embodiments, one or more of the procedures, the processes, and/or the activities in method 1500 can be combined or skipped. In some embodiments, the docking stand can be similar or identical to adjustable mobile-device docking stand 100 (FIG. 1). The electronic device can be the mobile device.

Referring to FIG. 15, method 1500 can include a block 1510 of providing a bottom support surface. In many embodiments, the bottom support surface can be similar or identical to bottom support surface 102 (FIG. 1). In certain embodiments, the bottom support surface can be configured to support a bottom side of the electronic device.

In some embodiments, method 1500 can include a block 1520 of providing a back support surface. In several embodiments, the back support surface can be similar or identical to back support surface 101 (FIG. 1). In many embodiments, the back support surface can be configured to support a side of the electronic device. For example, the back support surface can be configured to support a back side of the electronic device. In a number of embodiments, the back support surface can be substantially upright when a base of the docking stand is placed on a substantially horizontal surface. In a number of embodiments, the base of the docking stand can be similar or identical to stand base 105 (FIG. 1).

In a number of embodiments, method 1500 can include a block 1530 of providing a docking connector. In some embodiments, the docking connector can be similar or identical to docking connector 111 (FIG. 1). In many embodiments, the docking connector can be configured to removably attach to a docking port of the electronic device. The docking port can be proximate to the bottom side of the electronic device. In certain embodiments, the docking connector can be configured to pivot frontward and rearward relative to the back support surface. In several embodiments, the docking stand can be configured to support the docking connector in a substantially vertical configuration when the docking connector is detached from the docking port of the electronic device.

In many embodiments, method 1500 can include a block 1540 of providing an adjustment mechanism. In some embodiments, the adjustment mechanism can be similar or identical to adjustment mechanism 250 (FIG. 2). In several embodiments, the adjustment mechanism can be configured to adjust a height of the docking connector relative to the bottom support surface.

Figure 17:
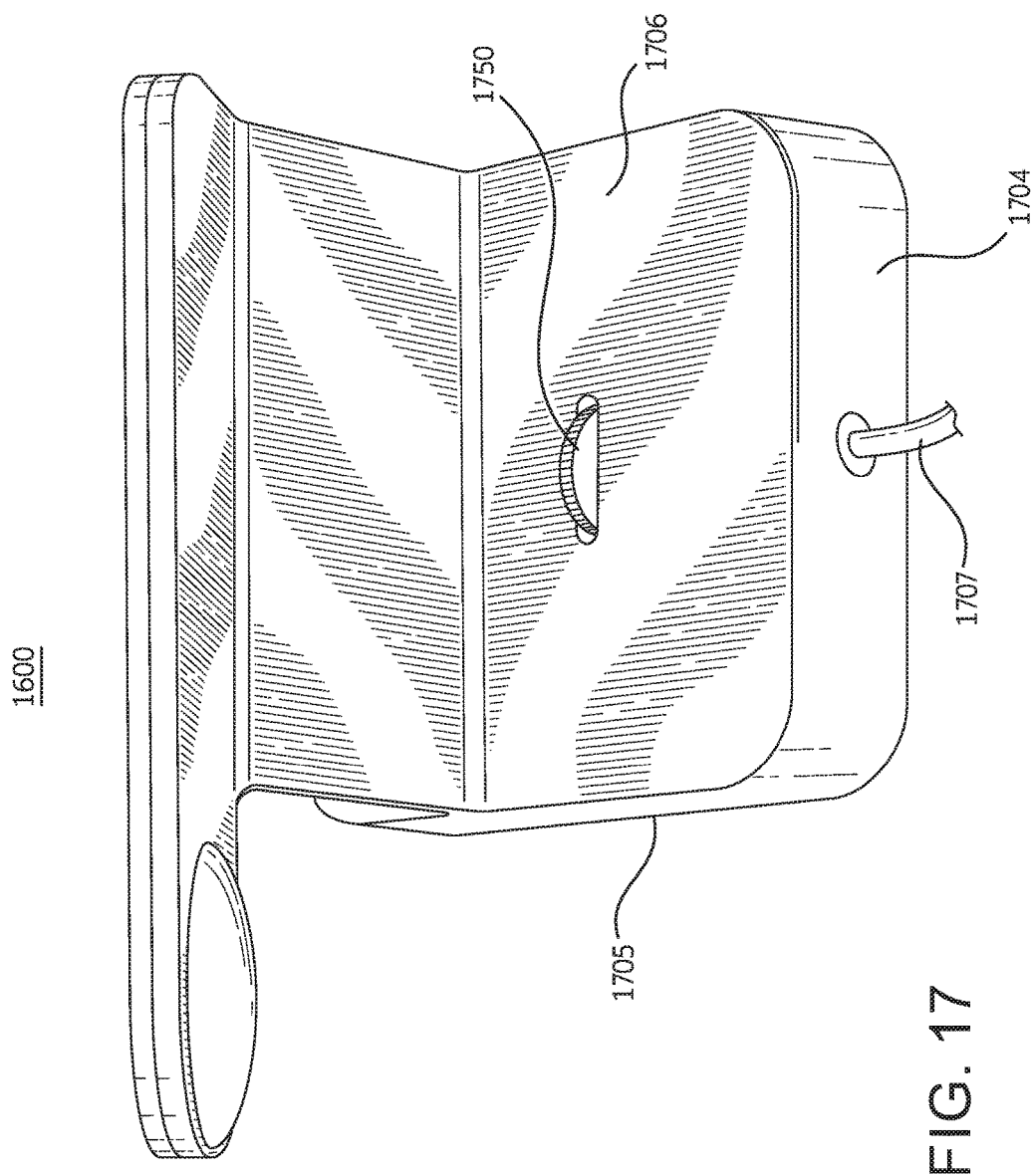
FIG. 17 illustrates a rear, top view of the adjustable mobile-device docking stand of FIG. 16.

Turning ahead in the drawings, FIG. 16 illustrates a front, top view of an adjustable mobile-device docking stand 1600. FIG. 17 illustrates a rear, top view of adjustable mobile-device docking stand 1600. Adjustable mobile-device docking stand 1600 is merely exemplary, and embodiments of the adjustable mobile-device docking stand are not limited to embodiments presented herein. The adjustable mobile-device docking stand can be employed in many different embodiments or examples not specifically depicted or described herein. In many embodiments, adjustable mobile-device docking stand 1600 can be similar to adjustable mobile-device docking stand 100 (FIGS. 1-14), and various component or constructions of adjustable mobile-device docking stand 1600 can be similar or identical to various components or constructions of adjustable mobile-device docking stand 100 (FIGS. 1-14).

In a number of embodiments, adjustable mobile-device docking stand 1600 can include a back support surface 1601, a bottom support surface 1602, a front 1603, and/or a rear 1704. Back support surface 1601 can be similar or identical to back support surface 101 (FIG. 1). Bottom support surface 1602 can be similar or identical to bottom support surface 102 (FIG. 1). Front 1603 can be similar or identical to front 103 (FIG. 1). Rear 1704 can be similar or identical to rear 104 (FIG. 1). In many embodiments, adjustable mobile-device docking stand 1600 can include a stand base 1705, a rear portion 1706, and/or a stand cable 1707. Stand base 1705 can be similar or identical to stand base 105 (FIG. 1). Rear portion 1706 can be similar or identical to rear portion 106 (FIG. 1). Stand cable 1707 can be similar or identical to stand cable 107 (FIG. 1).

In some embodiments, adjustable mobile-device docking stand 1600 can include a docking connector 1611. Docking connector 1611 can be similar or identical to docking connector 111 (FIG. 1). In many embodiments, at least a portion of docking connector 1611 can be surrounded by a connector stem 1610. Connector stem 1610 can be similar or identical to connector assembly 110 (FIG. 1). In certain embodiments, adjustable mobile-device docking stand 1600 can include a connector well 1612, and connector stem 1610 can be located partially or fully within connector well 1612. Connector well 1612 can be similar or identical to connector well 212 (FIG. 2). In many embodiments, connector well 1612 can include a connector well front wall (not shown), which can be similar or identical to connector well front wall 1215 (FIG. 12), and/or can include a connector well rear wall (not shown), which can be similar or identical to connector well rear wall 1216 (FIG. 12). In some embodiments, bottom support surface 1602 can include connector well 1612. In a number of embodiments, connector stem 1610, docking connector 1611, and/or connector well 1612 can be located at bottom support surface 1602, and in many embodiments, can be centered on bottom support surface 1602 between the sides of adjustable mobile-device docking stand 1600. Various components of adjustable mobile-device docking stand 1600 can be made of a suitable rigid polymer (e.g., polycarbonate (PC, or acrylonitrile butadiene styrene (ABS)), metal, and/or ceramic material.

In a number of embodiments, docking connector 1611 can be configured to connect with and/or removably attach to a docking port of a mobile device. For example, docking connector 1611 can be a 30-pin dock connector, which is compatible with the iPhone 4 (and previous generations), the iPod Touch (4th generation and previous generations), the iPod Nano (6th generation and previous generations), and the iPad 3 (and previous generations), developed and sold by Apple, Inc., of Cupertino, Calif., among other devices. As another example, docking connector 1611 can be a 8-pin Lightning connector, which is compatible with the iPhone 5, 5S, 5C, 6, 6 Plus, 6S, 6S Plus, SE, 7, and 7Plus; the iPod touch (5th and 6th generations); the iPod Nano (7th generation); and the iPad 4, Air, and Air 2, which are developed and sold by Apple, Inc., among other devices. In yet other embodiments, docking connector 1611 can be a USB connector. Docking connector 1611 can be another suitable docking connector for connecting adjustable mobile-device docking stand 1600 to the docking port of a mobile device. The docking port can be proximate to the bottom side of the electronic device. In some embodiments, when the mobile device is connected to docking connector 1611, the bottom of the mobile device, or the bottom of a case coupled to the mobile device, can rest upon bottom support surface 1602 and/or connector stem 1610.

In many embodiments, stand base 1705 can have a sufficient dimension to prevent adjustable mobile-device docking stand 1600 from tipping over when a mobile device is docked to docking connector 1611. In some embodiments, stand base 1705 can have a substantially rectangular shape, a substantially circular shape, a rounded rectangular shape, or another suitable shape for providing a support base for adjustable mobile-device docking stand 1600. In a number of embodiments, a dimension of stand base 1705 from side to side and/or a dimension of stand base 1705 from front 1603 to back 1704 can be approximately 3 in (7.62 cm) to approximately 5 in (12.7 cm). In other embodiments, the dimensions of stand base 1705 can be other suitable dimensions.

In some embodiments, back support surface 1601 can include one or more surfaces. For example, as shown in FIG. 16, back support surface 1601 can include a lower back support surface 1608 and an upper back support surface 1609 that are connected at a back support surface edge 1618. In other embodiments, back support surface 1601 can include a single substantially planar surface, similar or identical to back support surface 101 (FIG. 1). When adjustable mobile-device docking stand 1600 is placed on stand base 1705 on a substantially horizontal surface, one or more surfaces of back support surface 1601 (e.g., lower back support surface 1608 and/or upper back support surface 1609) can be substantially upright, such as that one or more of the surfaces of back support surface 1601 are substantially vertical and/or angled slightly rearward from vertical, so as to allow the back of the mobile device to be supported by back support surface 1601. In some embodiments, lower back support surface 1608 can be substantially upright and upper back support surface 1609 can be angled rearward with respect to lower back support surface 1608. In many embodiments, one or more parts of back support surface 1601 (e.g., lower back support surface 1608, upper back support surface 1609, and/or back support surface edge 1618) can support a side (e.g., a rear side) of the mobile device.

In a number of embodiments, bottom support surface 1602 can be substantially horizontal, or can be angled such that the rear portion of bottom support surface 1602 is lower than the front portion of bottom support surface 1602 when adjustable mobile-device docking stand 1600 is placed on a stand base 1605 of a substantially horizontal surface. In several embodiments, bottom support surface 1602 can support a bottom side of the mobile device. Such an angle can allow the mobile device, when docked to docking connector 1611, to be angled rearward from vertical, so as to allow the back of the mobile device to be support by one or more parts of back support surface 1601 (e.g., lower back support surface 1608, upper back support surface 1609, and/or back support surface edge 1618). In many embodiments, bottom support surface 1602 can be a substantially planar surface.

In several embodiments, adjustable mobile-device docking stand 1600 can include a magnetic charger 1691. In many embodiments, upper back support surface 1609 can extend to a right side (as shown in FIG. 16), or a left side (not shown) to a charging surface portion 1690. In several embodiments, charging surface portion 1690 can be substantially planar with upper back support surface 1609 and can include magnetic charger 1691. In a number of embodiments, magnetic charger 1691 can be used to charge a smart watch, such as the Apple Watch, developed and sold by Apple, Inc., of Cupertino, Calif., or another device that supports inductive charging. For example, magnetic charger 1691 can include one or more magnets to automatically connect and align the smart watch to magnetic charger 1691. Magnetic charger 1691 can include inductive charging coils, such that when the smart watch is placed on and aligned with magnetic charger 1691, the smart watch can be inductively charged.

In many embodiments, adjustable mobile-device docking stand 1600 can include a stand cable 1707. Stand cable 1707 can be similar or identical to stand cable 107 (FIG. 1). In a number of embodiments, stand cable 1707 can be electrically coupled to docking connector 1611 and/or induction charging coils in magnetic charger 1691. In some embodiments, stand cable 1707 can extend from rear 1704 and can allow adjustable mobile-device docking stand 1600, the mobile device, and/or the smart watch to be connected to one or more external resources or peripheral devices, such as a power source, a video display, a stereo system, a computer, a keyboard, an alarm clock, and/or other suitable resources or peripheral devices. For example, stand cable 1707 can be a USB cable with a USB plug, which can connect to a computer.

In several embodiments, adjustable mobile-device docking stand 1600 can include an adjustment mechanism, such as adjustment wheel 1750. Adjustment wheel 1750 can be similar or identical to adjustment wheel 250 (FIG. 2). In certain embodiments, rear portion 1706 can include adjustment wheel 1750. Adjustment wheel 1750 can be used to raise and lower, or to otherwise adjust, docking connector 1611 and/or connector stem 1610 with respect to bottom support surface 1602 and/or adjustable mobile-device docking stand 1600. In other embodiments, adjustment wheel 1750 can be another suitable adjustment mechanism, such as an adjustment slider, an adjustment button, or another suitable adjustment mechanism. In many embodiments, the adjustment mechanism, such as adjustment wheel 1750, can be located at rear portion 1706 of adjustable mobile-device docking stand 1600 behind back support surface 1601.

In many embodiments, connector stem 1610 and docking connector 1611 can be adjusted, such as raised and lowered, similarly to how connector assembly 110 (FIG. 1) and docking connector 111 (FIG. 1) can be raised and lowered as shown in FIGS. 3-4. For example, in one position, a top of connector stem 1610 can be substantially parallel with a top of bottom support surface 1602, and in another position, a top of connector stem 1610 can be substantially higher than a top of bottom support surface 1602. In yet another position, a top of connector stem 1610 can be substantially lower than a top of bottom support surface 1602. In certain embodiments, connector stem 1610 and/or docking connector 1611 can be raised and/or lowered with respect to bottom support surface 1602 such that the highest position is at least 5 mm higher than the lowest position. In other embodiments, the highest position of connector stem 1610 and/or docking connector 1611 can be at least 10, 15, 20, 25, or 30 mm higher than the lowest position. By varying of the height connector stem 1610 and/or docking connector 1611 with respect to bottom support surface 1602, adjustable mobile-device docking stand 1600 can advantageously accommodate docking to mobile devices inside cases of varying thicknesses, and/or can advantageously accommodate docking to mobile devices in which the docking port is located in different positions on the mobile devices (e.g., at the bottom of the mobile device or above the bottom of the mobile device, as described above in connection with FIGS. 5-6).

Figure 18:
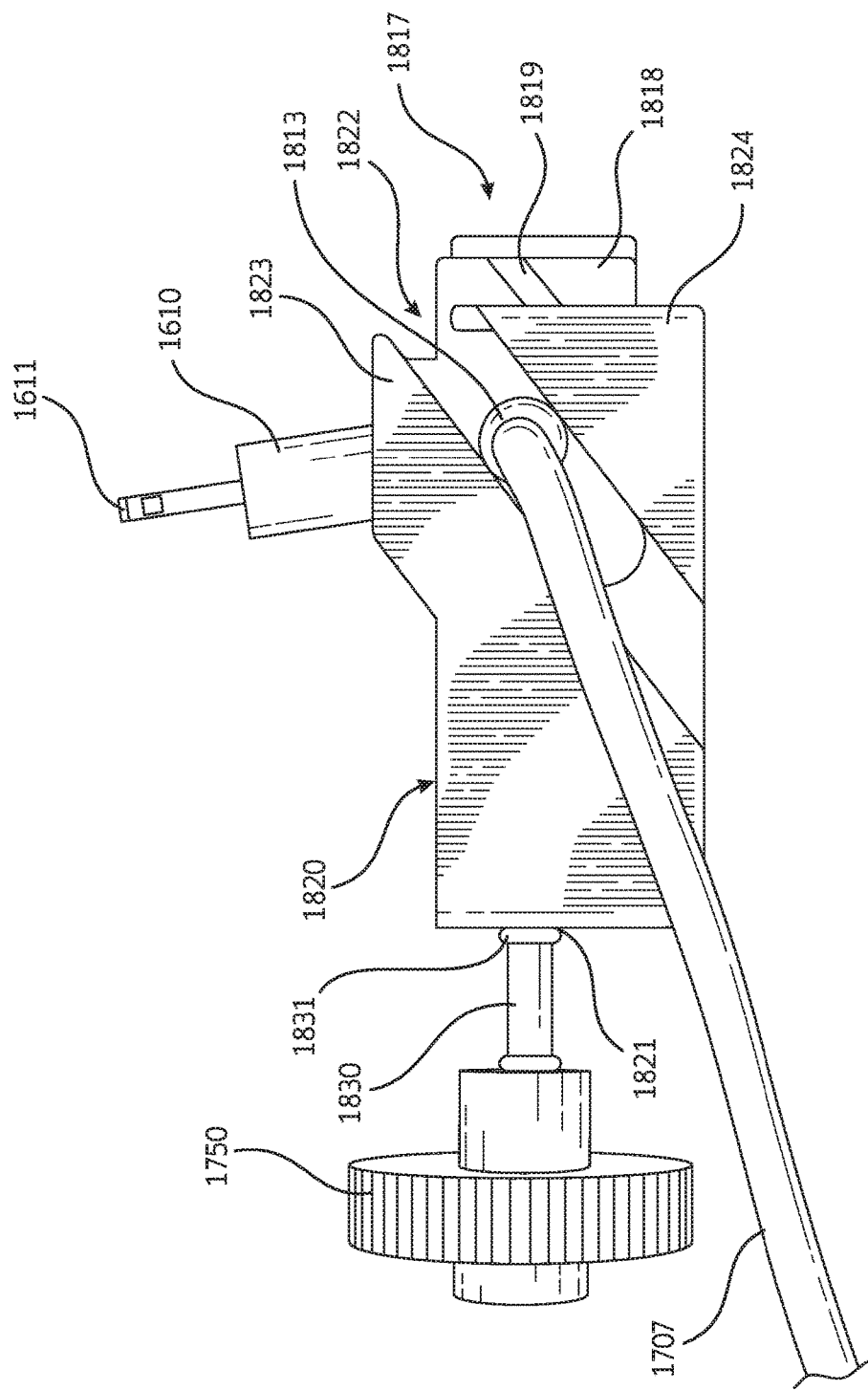
FIG. 18 illustrates a left side view of various components of the adjustable mobile-device docking stand of FIG. 16, including the adjustment wheel of FIG. 17, an axle, an adjustment sled, and a connector assembly.
Figure 19:
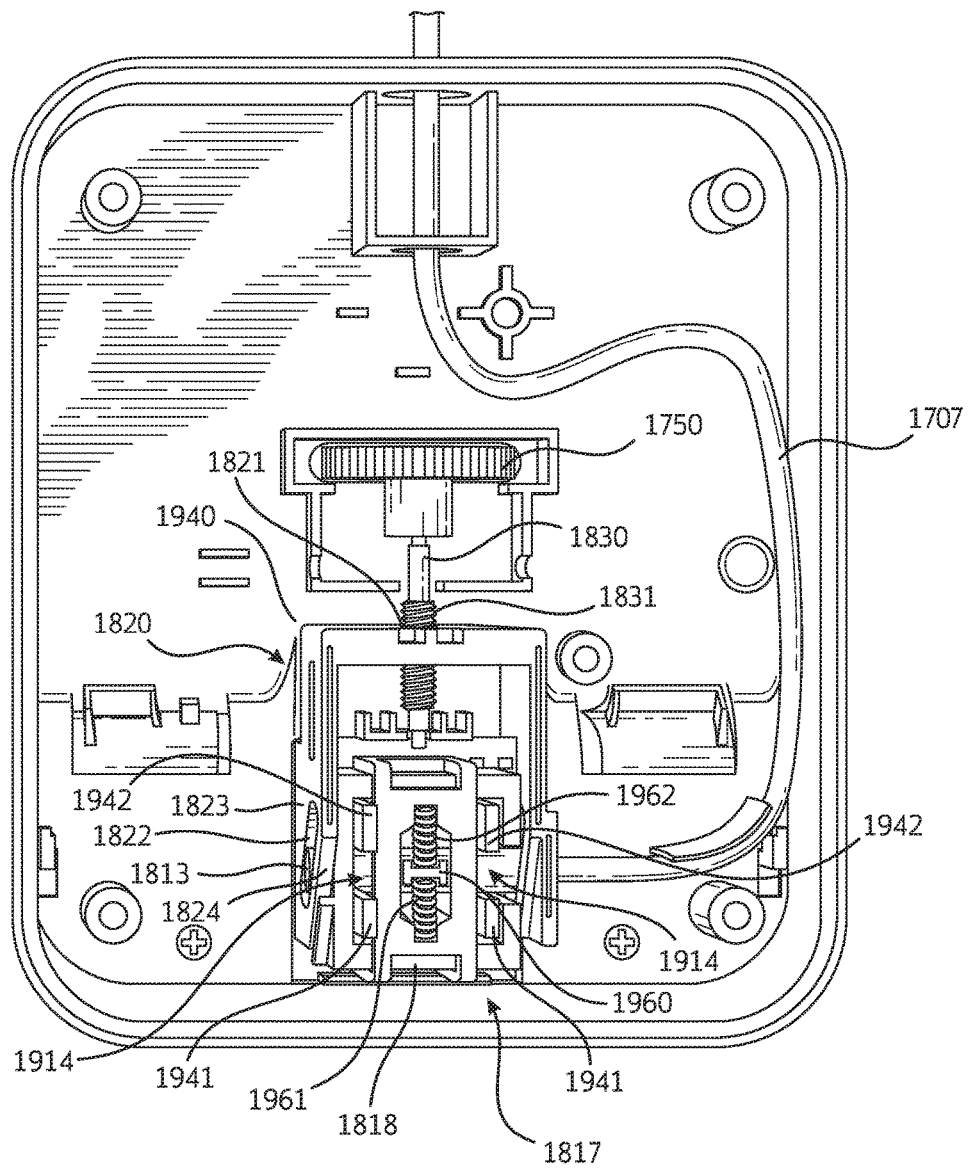
FIG. 19 illustrates a bottom view of the adjustable mobile-device docking stand of FIG. 16 with the base of FIG. 17 removed to show the adjustment wheel of FIG. 17, the axle of FIG. 18, the adjustment sled of FIG. 18, and the connector assembly of FIG. 18, as assembled within the adjustable mobile-device docking stand of FIG. 16.
Figure 20:
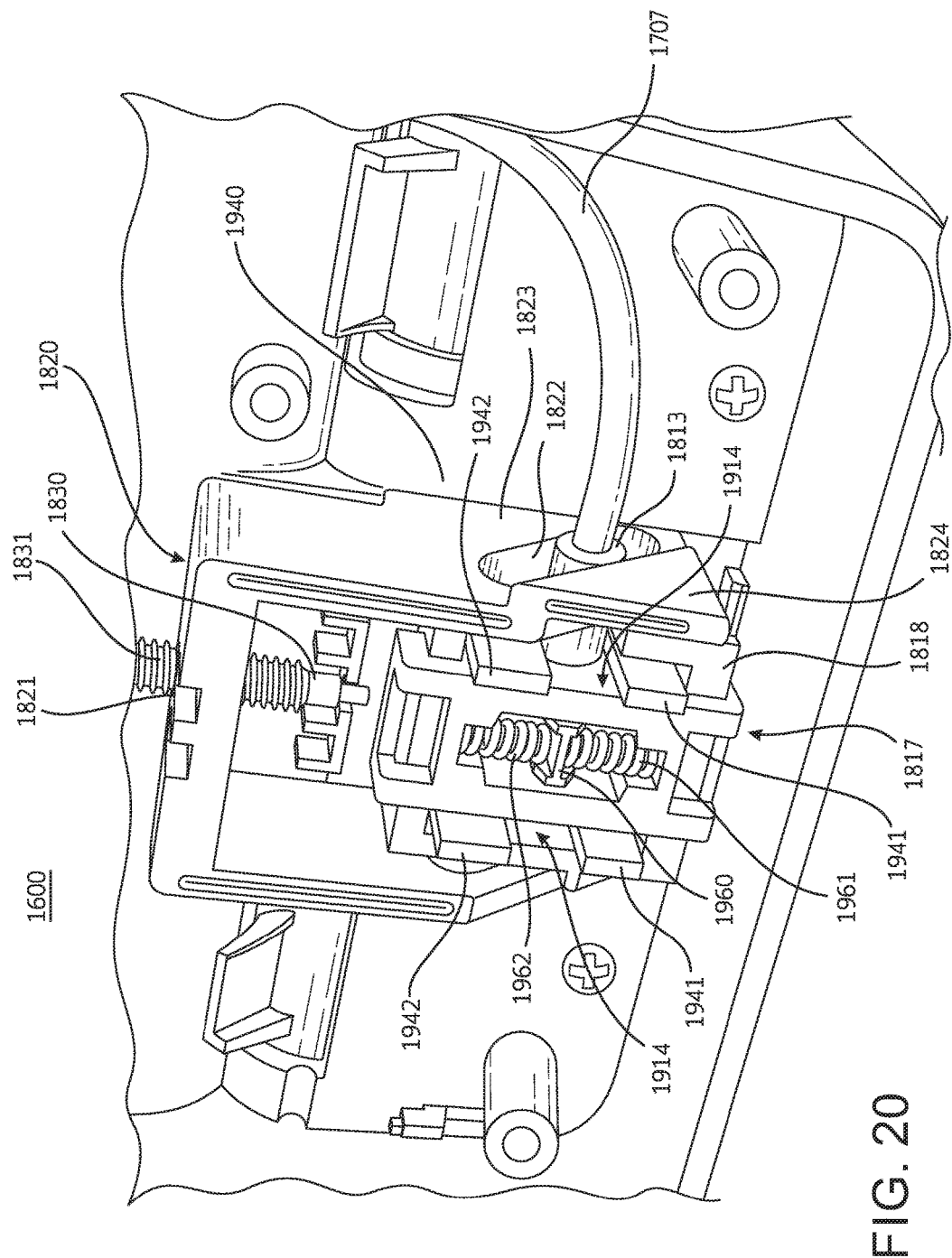
FIG. 20 illustrates a bottom, left side view of a portion of the adjustable mobile-device docking stand of FIG. 16 with the base of FIG. 17 removed to show the adjustment sled of FIG. 18, and the connector assembly of FIG. 18, as assembled within the adjustable mobile-device docking stand of FIG. 16.

Turning ahead in the drawings, FIG. 18 illustrates a left side view of various components of adjustable mobile-device docking stand 1600 (FIGS. 16-17), including adjustment wheel 1750, an axle 1830, an adjustment sled 1820, and a connector assembly 1817. FIG. 19 illustrates a bottom view of adjustable mobile-device docking stand 1600 with base 1705 removed to show adjustment wheel 1750, axle 1830, adjustment sled 1820, and connector assembly 1817, as assembled within adjustable mobile-device docking stand 1600. FIG. 20 illustrates a bottom, left side view of a portion of adjustable mobile-device docking stand 1600 with base 1705 removed to show adjustment sled 1820, and connector assembly 1817, as assembled within adjustable mobile-device docking stand 1600. In many embodiments, adjustable mobile-device docking stand 1600 (FIGS. 16-17, 19-20) can include adjustment sled 1820. Adjustment sled 1820 can be similar to adjustment sled 720 (FIG. 7), and various components or constructions of adjustment sled 1820 can be similar or identical to various components or constructions of adjustment sled 720 (FIG. 7). In many embodiments, adjustment sled 1820 can include a threaded sled portion 1821. Threaded sled portion 1821 can be similar to threaded sled portion 721 (FIG. 7).

In a number of embodiments, adjustable mobile-device docking stand 1600 (FIGS. 16-17, 19-20) can include axle 1830. Axle 1830 can be similar to axle 730 (FIG. 7). In many embodiments, axle 1830 can be centered between the sides of adjustable mobile-device docking stand 1600 (FIG. 16). In some embodiments, axle 1830 can include a threaded axle portion 1831. Threaded axle portion 1831 can be similar to threaded axle portion 731 (FIG. 7). In several embodiments, adjustment wheel 1750 can be connected to axle 1830, and, in many embodiments, can share a radial axis with axle 1830. Threaded axle portion 1831 can be threaded inside threaded sled portion 1821, such that rotation of threaded axle portion 1831 can cause threaded sled portion 1821 to be adjusted and move frontward or rearward. In a number of embodiments, rotating adjustment wheel 1750 clockwise when viewed from the front can cause adjustment sled 1820 to move frontward, and rotating adjustment wheel counter-clockwise when viewed from the front can cause adjustment sled 1820 to move rearward. In other embodiments, rotating adjustment wheel 1750 can cause adjustment sled 1820 to move in the opposite direction than as stated above. In many embodiments, alignment sled can fit between a base assembly 1940 (FIGS. 19-20) of adjustable mobile-device docking stand 1600 (FIGS. 16-17, 19-20) and stand base 1705 (FIG. 17), and can be aligned by base assembly 1940 (FIGS. 19-20), stand base 1705 (FIG. 17), and/or axle 1830 to align the adjustment of adjustment sled 1820 such that adjustment sled 1820 can be adjusted frontward and rearward, and such that the movement of adjustment sled 1820 is substantially horizontal in a frontward/rearward direction when adjustable mobile-device docking stand 1600 (FIGS. 16-17, 19-20) is placed on a substantially horizontal surface. In many embodiments, adjustment of adjustment wheel 1750 can move adjustment sled 1820 substantially parallel with stand base 1705 (FIG. 17).

In many embodiments, adjustment sled 1820 can include a sled channel 1822, a sled channel top 1823, and/or a sled channel bottom 1824. Sled channel 1822 can be similar to sled channel 822 (FIG. 8). Sled channel top 1823 can be similar to sled channel top 823 (FIG. 8). Sled channel bottom 1824 can be similar or identical to sled channel bottom 824 (FIG. 8). In several embodiments, sled channel 1822, sled channel top 1823, and/or sled channel bottom 1824 can be one side, or alternatively, on the right side and the left side of adjustment sled 1820.

In a number of embodiments, adjustable mobile-device docking stand 1600 (FIGS. 16-17, 19-20) can include connector assembly 1817. In many embodiments, connector assembly 1817 can include connector stem 1610 and/or docking connector 1611. In some embodiments, connector assembly 1817 can include a connector base 1818. In several embodiments, connector base 1810 can include one or more channel alignment tabs, such as channel alignment tab 1819, which can engage with one or more channel alignment grooves (not shown) in sled channel top 1823 and/or sled channel bottom 1824. In many embodiments, the channel alignment tabs (e.g., 1819) and channel alignment grooves in sled channel top 1823 and/or sled channel bottom 1824 can be parallel to sled channel 1822, and can guide adjustment of connector base 1818 and/or connector assembly 1817 upwards or downwards as adjustment sled 1820 slides rearward or frontward. In a number of embodiments, connector base 1817 can include a connector assembly pivot 1813 on one side, or alternatively, on the right side and the left side of connector base 1817. Connector assembly pivot 1813 can be similar to connector assembly pivot 813 (FIG. 8). In many embodiments, connector assembly pivot 1813 can have a circular cross section when viewed from the side, and/or can be configured to fit within and/or slide along sled channel 1822. In many embodiments, sled channel top 1823 and/or sled channel bottom 1824 can secure connector assembly pivot 1813 within sled channel 1822.

In several embodiments, when adjustable mobile-device docking stand 1600 (FIGS. 16-17, 19-20) is placed on a substantially horizontal surface, sled channel 1822 can have an angled incline toward the front of adjustable mobile-device docking stand 1600 (FIGS. 16-17, 19-20), such that the front portion of sled channel 1822 is located above the rear portion of sled channel 1822. In many embodiments, adjustment of adjustment wheel 1750 can adjust the height of connector base 1818, connector assembly 1817, and/or connector assembly pivot 1813 within sled channel 1822, and/or can adjust the height and/or position of connector stem 1610 and/or docking connector 1611 relative to bottom support surface 1602. For example, by rotating adjustment wheel 1750 such that adjustment sled 1820 is moved rearward, connector assembly pivot 1813 and/or connector assembly 1817 can be adjusted upward, such that connector stem 1610 and/or docking connector 1611 can be raised. By rotating adjustment wheel 1750 such that adjustment sled 1820 is moved frontward, connector assembly pivot 1813 and/or connector assembly 1817 can be adjusted downward, such that connector stem 1610 and/or docking connector 1611 can be lowered.

In many embodiments, as shown in FIGS. 19-20, base assembly 1940 can include, or be fixedly attached to, pivot channel front pieces 1941 and/or pivot channel rear pieces 1942, which can define a pivot channel 1914 between pivot channel front pieces 1941 and pivot channel rear pieces 1942. Pivot channel 1914 can be similar to pivot channel 1114 (FIG. 11). In many embodiments, pivot channel front pieces 1941 and/or pivot channel rear pieces 1942 can constrain the motion of connector assembly pivot 1813 within pivot channel 1914, such that as adjustment sled 1820 and sled channel 1822 move frontward and rearward, connector assembly pivot 1813, connector assembly 1817, connector stem 1610 (FIGS. 16, 18), and/or docking connector 1611 (FIGS. 16, 18) can be raised and/or lowered within pivot channel 1914. In a number of embodiments, connector assembly pivot 1813 can be retained within pivot channel 1914 by pivot channel front pieces 1941 and pivot channel rear pieces 1942. In many embodiments, pivot channel 1914 can be substantially parallel to one of more surfaces of back support surface 1601 (FIG. 16). In other embodiments, pivot channel 1914 can be substantially vertical when adjustable mobile-device docking stand 1600 is placed on a substantially horizontal surface.

In a number of embodiments, connector assembly 1817 can include a centering fin 1960, a front compression spring 1961, and a rear compression spring 1962. In many embodiments, centering fin 1960 can be fixedly attached to connector stem 1610 (FIGS. 16, 18) and connector assembly pivot 1813. In several embodiments, connector stem 1610 (FIGS. 16, 18), docking connector 1611 (FIGS. 16, 18), and centering fin 1960 can pivot about connector assembly pivot 1813 with respect to connector base 1818 within connector assembly 1817. For example, in some embodiments, connector assembly pivot 1813 can fit within a hole on one or more sides of connector base 1818. In several embodiments, stand cable 1707 can be connected to connector assembly 1817 through one of connector assembly pivot 1813, such that stand cable 1707 is axially connected and twists as connector stem 1610 (FIGS. 16, 18), docking connector 1611 (FIGS. 16, 18), and centering fin 1960 pivots about connector assembly pivot 1813 with respect to connector base 1818 within connector assembly 1817, which can advantageously reduce the movement of stand cable 1707 and prevent stand cable 1707 from fraying. In a number of embodiments, front compression spring 1961 can be connected to centering fin 1960 and the front of connector base 1818, and can push centering fin 1960 rearward. In many embodiments, rear compression spring 1962 can be connected to centering fin 1960 and the rear of connector base 1818, and can be push centering fin 1960 frontward. Together, front compression spring 1961 and rear compression spring 1962 can center bias centering fin 1960, such that connector stem 1610 (FIGS. 16, 18) and/or docking connector 1611 (FIGS. 16, 18) can be positioned at a neutral pivot position within connector well 1612 (FIG. 16) between the connector well front wall and the connector well rear wall, while allowing connector stem 1610 (FIGS. 16, 18) and/or docking connector 1611 (FIGS. 16, 18) to pivot frontward and rearward within connector well 1612 (FIG.

16). In other embodiments, torsion springs can be used instead of compression springs (e.g., 1961, 1962). In some embodiments, the neutral pivot position can be substantially vertical. In other embodiments, the neutral pivot position can be angled approximately 5 degrees to approximately 20 degrees rearward from vertical. For example, the neutral pivot position can be angled approximately 10 degrees rearward from vertical.

In many embodiments, connector stem 1610 (FIGS. 16, 18) and/or docking connector 1611 (FIGS. 16, 18) can pivot frontward and/or rearward relative to back support surface 1601 (FIG. 16). In several embodiments, centering fin 1960, front compression spring 1961, and rear compression spring 1962 can allow connector stem 1610 (FIGS. 16, 18) and/or docking connector 1611 (FIGS. 16, 18) to pivot frontward and/or rearward relative to back support surface 1601 (FIG. 16). In a number of embodiments, connector stem 1610 (FIGS. 16, 18) and/or docking connector 1611 (FIGS. 16, 18) can be raised and/or lowered within connector well 1612 (FIG. 16), and able to pivot frontward and rearward within connector well 1612 (FIG. 16).

In many embodiments, when adjustable mobile-device docking stand 1600 is placed on a substantially horizontal surface, centering fin 1960, front compression spring 1961, and rear compression spring 1962 can hold connector stem 1610 (FIGS. 16, 18) and/or docking connector 1611 (FIGS. 16, 18) in a substantially vertical default position such that, when a mobile device is not connected to docking connector 1611 (FIGS. 16, 18), connector stem 1610 (FIGS. 16, 18) is not being bent frontward or rearward. This default vertical (or substantially vertical, such as less than approximately 20 degrees angled rearward from vertical) position of connector stem 1610 (FIGS. 16, 18) and/or docking connector 1611 (FIGS. 16, 18) can advantageously facilitate ease of docking the mobile device with docking connector 1611 (FIG. 16, 18), such that the mobile device can be docked with adjustable mobile-device docking stand 1600 by simply holding the mobile device vertically over docking connector 1611 (FIGS. 16, 18) and pushing the mobile device downward in a substantially vertical direction. In many embodiments, when the mobile device is connected to docking connector 1611 (FIGS. 16, 18), centering fin 1960, front compression spring 1961, and rear compression spring 1962 can be configured such that the weight of the mobile device can cause connector stem 1610 (FIGS. 16, 18) and/or docking connector 1611 (FIGS. 16, 18) to pivot rearwards such that the mobile device and/or mobile-device case rests against and/or is supported by at least a portion of back support surface 1601 (FIG. 16). In many embodiments, connector stem 1610 (FIGS. 16, 18) and/or docking connector 1611 (FIGS. 16, 18) can have a default vertical position (which in some embodiments can be the neutral pivot position) and/or can pivot around connector assembly pivot 1813 when in a raised and/or lowered position.

Figure 21:
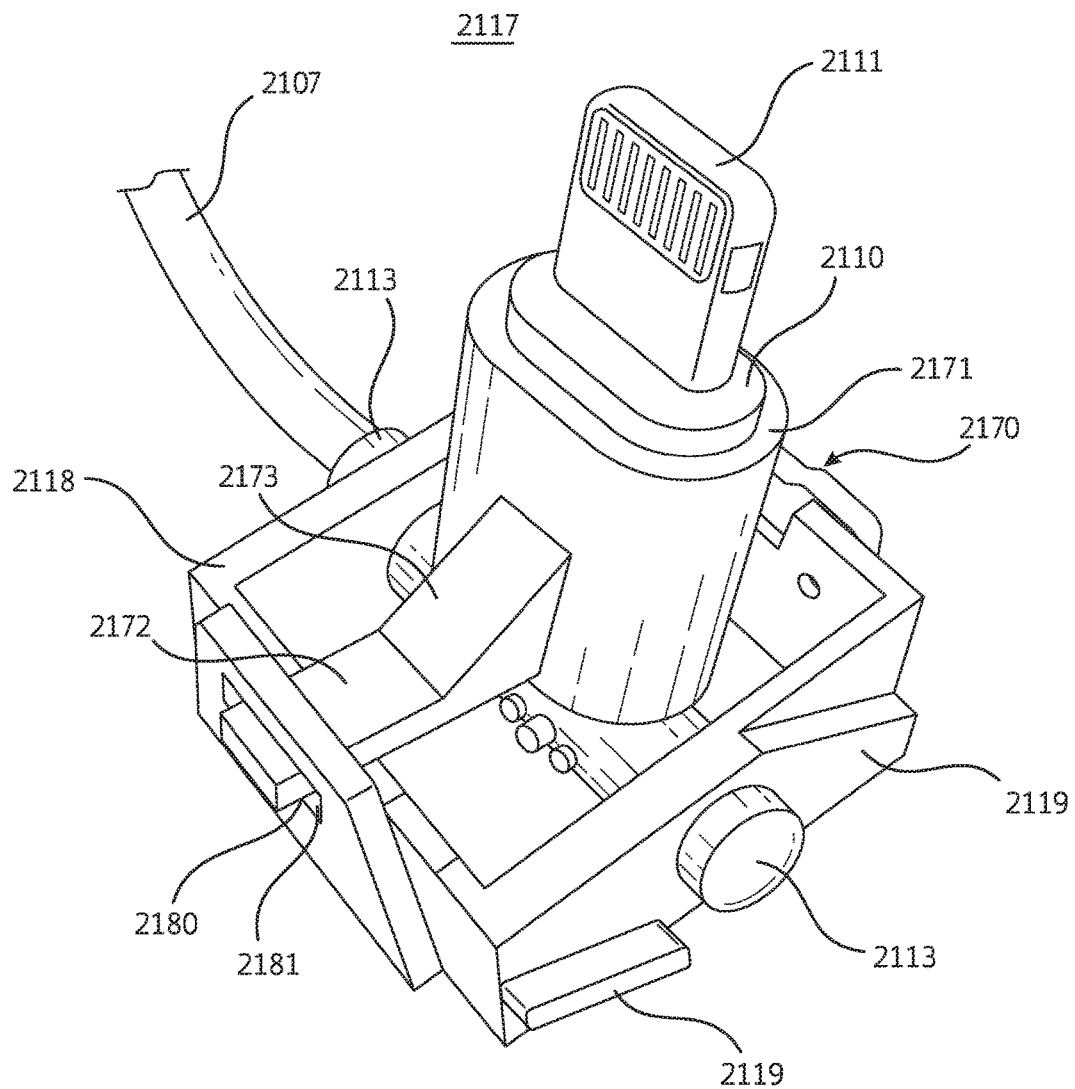
FIG. 21 illustrates a front, top, right side perspective view of a connector assembly, according to another embodiment.

Turning ahead in the drawings, FIG. 21 illustrates a front, top, right side perspective view of a connector assembly 2117. Connector assembly 2117 is merely exemplary, and embodiments of the connector assembly are not limited to embodiments presented herein. The connector assembly can be employed in many different embodiments or examples not specifically depicted or described herein. Connector assembly 2117 can be similar to connector assembly 1817 (FIGS. 18-20), and various components or constructions of connector assembly 2117 can be similar or identical to various components or constructions of connector assembly 1817 (FIGS. 18-20). In many embodiments, connector assembly 2117 can include a docking connector 2111, which can be surrounded at least partially by a connector stem 2110. Docking connector 2111 can be similar or identical to docking connector 111 (FIG. 1) and/or docking connector 1611 (FIG. 16). Docking connector 2111 can be configured to connect with and/or removably attach to a docking port of a mobile device, such as the mobile devices described above. Connector stem 2110 can be similar or identical to connector assembly 110 (FIG. 1) and/or connector stem 1610 (FIG. 16). In some embodiments, connector assembly 2117 can include a connector base 2118. Connector base 2118 can be similar to connector base 1818 (FIGS. 18-20). In several embodiments, connector base 2118 can include one or more channel alignment tabs, such as channel alignment tab 2119, which can be similar or identical to channel alignment tab 1819 (FIG. 18). In a number of embodiments, connector assembly 2117 can include a connector assembly pivot 2113 on one side, or alternatively, on the right side and the left side of connector assembly 2117 (as shown in FIG. 21). Connector assembly pivot 2113 can be similar or identical to connector assembly pivot 813 (FIG. 8) and/or connector assembly pivot 1813 (FIG. 18). In several embodiments, a stand cable 2107 can extend axially out of one of connector assembly pivot 2113. Stand cable 2107 can be similar or identical to stand cable 107 (FIG. 1) and/or stand cable 1707 (FIG. 17).

In many embodiments, connector assembly 2117 can include an ejector 2170. In several embodiments, ejector 2170 can include a sleeve 2171 and/or a tab 2172. In many embodiments, sleeve 2171 can at least partially surround docking connector 2111 and/or connector stem 2110. For example, as shown in FIG. 21, sleeve 2171 can surround connector stem 2110 and have a shape that conforms around connector stem 2110. In other embodiments, sleeve 2171 can have another suitable shape. For example, another sleeve could have protrusions that extend upward two or more sides of the sleeve. In several embodiments, tab 2172 can extend from sleeve 2171 to an ejector connection point 2180 on connector base 2118. For example, ejector connection point 2180 can be on a front side of connector base 2118, as shown in FIG. 21. In many embodiments, connector base 2118 can include a slot 2181, and tab 2172 can extend from sleeve 2171 through slot 2181. In a number of embodiments, ejector 2170 can include a gusset 2173 at the interface between sleeve 2171 and tab 2172 to provide structural support to keep tab 2172 extending away from sleeve 2171. In some embodiments, ejector 2170 can be made of a suitable rigid material, such as a metal, glass, PC, ABS, a ceramic material, and/or another suitable material that is strong enough to not bind. In a number of embodiments, a sliding clearance can exist between sleeve 2171 and connector stem 2110, such as a space of approximately 0.05 mm to approximately 0.8 mm.

Turning ahead in the drawings, FIG. 22 illustrates a right side view of connector assembly 2117 with docking connector 2111 in a neutral pivot position. FIG. 23 illustrates a right side view of connector assembly 2117 with docking connector 2111 rotated frontward from the neutral pivot position. FIG. 24 illustrates a right side view of connector assembly 2117 with docking connector 2111 rotated further frontward from the neutral pivot position. In some embodiments, the neutral pivot position can be substantially vertical. In other embodiments, the neutral pivot position can be angled approximately 5 degrees to approximately 20 degrees rearward from vertical. For example, the neutral pivot position can be angled approximately 10 degrees rearward from vertical. In a number of embodiments, ejector 2170 can be configured to push the mobile device (with or without a case) at least partially off docking connector 2111 when docking connector 2111 and/or the mobile device (with or without a case) is rotated or pivoted in a first direction relative to connector base 2118. For example, as shown in FIGS. 22-24, as docking connector 2111 is rotated or pivoted frontward toward the front of connector base 2118, ejector 2170 can push sleeve 2171 of ejector 2170 upward and away from connector assembly pivot 2113. In other embodiments, an ejector (e.g., 2170) can be configured to push the mobile device (with or without a case) at least partially off the docking connector (e.g., 2111) when the docking connector (e.g., 2111) and/or mobile device is rotated in another direction, such as rearward, to the right side, to the left side, etc. of connector base 2118.

In a number of embodiments, tab 2172 is slidable with respect to ejector connection point 2180. For example, as docking connector 2111 is rotated or pivoted frontward with respect to connector base 2118, tab 2172 can slide frontward along ejector connection point 2180, which can push sleeve 2171 along docking connector 2111 and/or connector stem 2110 outward from connector base 2118 (e.g., outward from connector assembly pivot 2113 along docking connector 2111). In several embodiments, sleeve 2171 can push on the mobile device proximate (e.g., within 2 cm, 1 cm, 0.5 cm, or 0.2 cm) to the docking port that connects to docking connector 2111. In many embodiments, tab 2172 can slide through slot 2181 as docking connector 2111 is rotated or pivoted frontward with respect to connector base 2118. As shown in FIGS. 22-24, as docking connector 2111 is rotated or pivoted frontward with respect to connector base 2118, tab 2172 can slide frontward, pushing sleeve 2171 upward and away from connector base 2118 and/or connector assembly pivot 2113. In some embodiments, slot 2181 can facilitate sleeve 2171 returning back downward on connection stem 2110 after sleeve 2171 is pushed upwards to eject the mobile device.

In some embodiments, docking connector 2111 can be configured to rotate or pivot in the first direction (e.g., frontward, or another direction) for a predetermined angular rotation from the neutral pivot position before ejector 2170 pushes the mobile device fully, or at least partially, off of docking connector 2111. For example, docking connector 2111 and/or connector stem 2110 can rotate or pivot frontwards with respect to connector base 2118 approximately 5 degrees to approximately 10 degrees before sleeve 2171 begins to move upward away from connector base 2118 and/or connector assembly pivot 2113. This "slack" in rotation before sleeve 2171 pushes upward can beneficially allow for mobile devices that are thicker, or that are coupled to thicker cases, to be docked on docking connector 2111 without sleeve 2171 pushing upwards to eject the mobile device, despite the thicker mobile device or thicker cases pushing docking connector 2111 frontward slightly (e.g., less than approximately 5 to approximately 10 degrees) when resting against a back support surface, such as back support surface 1601 (FIG. 16). In many embodiments, docking connector 2111 and/or connector stem 2110 can rotate or pivot rearward with respect to connector base 2118 from the neutral pivot position without sleeve 2171 moving upward away from connector assembly pivot 2113 and/or without sleeve 2171 moving further downward toward connector assembly pivot 2113.

Turning ahead in the drawings, FIG. 25 illustrates a front, top, right side perspective view of a partial cross-section of a connector assembly 2517 having an ejector 2570 with a sleeve 2571 that is devoid of a step. FIG. 26 illustrates a front, top, right side perspective view of a partial cross-section of a connector assembly 2617 having an ejector 2670 with a sleeve 2671 that includes steps 2673 and 2674. Connector assemblies 2517 and 2617 are merely exemplary, and embodiments of the connector assemblies are not limited to embodiments presented herein. The connector assemblies can be employed in many different embodiments or examples not specifically depicted or described herein. Connector assembly 2517 and/or 2617 can be similar to connector assembly 1817 (FIGS. 18-20) and/or connector assembly 2117 (FIG. 21), and various components or constructions of connector assemblies 2517 and/or 2617 can be similar or identical to various components or constructions of connector assembly 1817 (FIGS. 18-20) and/or connector assembly 2117 (FIG. 21).

In many embodiments, connector assemblies 2517 and/or 2617 each can include a docking connector 2511. Docking connector 2511 can be similar or identical to docking connector 111 (FIG. 1), docking connector 1611 (FIG. 16), and/or docking connector 2111 (FIG. 21). Docking connector 2511 can be configured to connect with and/or removably attach to a docking port of a mobile device, such as the mobile devices described above. Connector assemblies 2517 and/or 2617 each can include a connector base 2518. Connector base 2518 can be similar to connector base 1818 (FIGS. 18-20) and/or connector base 2118 (FIG. 2118). In a number of embodiments, connector assemblies 2517 and/or 2617 each can include one or more connector assembly pivots 2513. Connector assembly pivots 2513 can be similar or identical to connector assembly pivot 813 (FIG. 8), connector assembly pivot 1813 (FIG. 18), and/or connector assembly pivot 2113 (FIG. 21). In many embodiments, connector assemblies 2517 and/or 2617 each can include a centering fin 2560, a front compression spring 2561, and a rear compression spring 2562. Centering fin 2560 can be similar or identical to centering fin 1960 (FIG. 19). Front compression spring 2561 can be similar or identical to front compression spring 1961 (FIG. 19). Rear compression spring 2562 can be similar or identical to rear compression spring 1962 (FIG. 19). In several embodiments, a stand cable 2507 can extend axially out of one of connector assembly pivots (not shown), which can advantageously reduce the movement of stand cable 2507 and prevent stand cable 2507 from fraying. Stand cable 2507 can be similar or identical to stand cable 107 (FIG. 1), stand cable 1707 (FIG. 17), and/or stand cable 2107 (FIG. 21).

As shown in FIG. 25, docking connector 2511 can be at least partially surrounded by a connector stem 2510. Connector stem 2510 can be similar or identical to connector assembly 110 (FIG. 1), connector stem 1610 (FIG. 16), and/or connector stem 2110 (FIG. 21). As shown in FIG. 26, docking connector 2611 can be at least partially surrounded by a connector stem 2610. Connector stem 2610 can be similar to connector assembly 110 (FIG. 1), connector stem 1610 (FIG. 16), connector stem 2110 (FIG. 21), and/or connector stem 2510 (FIG. 25), but can have a connector shielding 2612 that is exposed because a cover 2613 of connector stem 2610 is shorter than a cover of connector stem 2510 (FIG. 25). In some embodiments, cover 2613 can be made of polypropylene, and/or connector shielding 2612 can be made of sheet metal or another suitable material. In other embodiments, cover 2613 and/or connector shielding 2612 can be made of other suitable materials.

In many embodiments, connector assembly 2517 can include an ejector 2570. Ejector 2570 can be similar to ejector 2170 (FIG. 21), and various components or constructions of ejector 2570 can be similar or identical to various components or constructions of ejector 2170 (FIG. 21). In several embodiments, ejector 2570 can include a sleeve 2571 and/or a tab 2572. Sleeve 2571 can be similar or identical to sleeve 2171 (FIG. 21). Tab 2572 can be similar or identical to tab 2172 (FIG. 21).

In several embodiments, connector assembly 2617 can include an ejector 2670. Ejector 2670 can be similar to ejector 2170 (FIG. 21) and/or ejector 2570 (FIG. 25), and various components or constructions of ejector 2670 can be similar or identical to various components or constructions of ejector 2170 (FIG. 21) and/or ejector 2570 (FIG. 25). In several embodiments, ejector 2670 can include a sleeve 2671 and/or a tab 2672. Sleeve 2571 can be similar to sleeve 2171 (FIG. 21) and/or sleeve 2571 (FIG. 21), but can include steps 2673 and 2674. Tab 2672 can be similar or identical to tab 2172 (FIG. 21) and/or tab 2572 (FIG. 25). In some embodiments, the steps in sleeve 2671 can be narrowing steps at the sleeve extends upward along docking connector 2611 away from connector assembly pivot 2513. For example, step 2673 can narrow sleeve 2671 from a width surrounding cover 2613 to a narrowed width surrounding connector shielding 2612. As another example, step 2674 can narrow sleeve 2671 from the width surrounding shielding 2612 to the narrower width of docking connector 2511.

Figure 28:
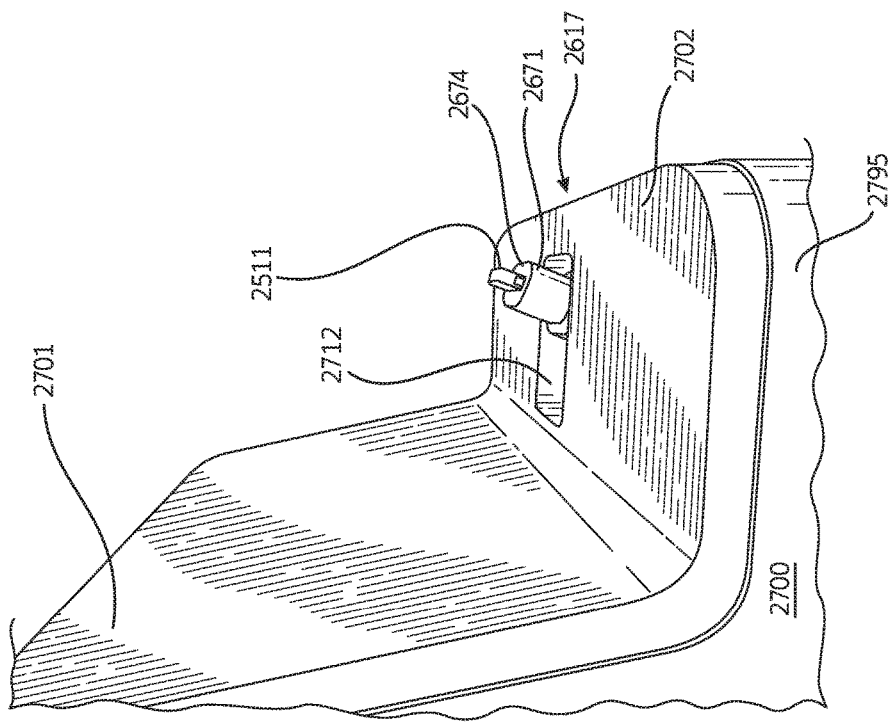
FIG. 28 illustrates a front, left side view of the adjustable mobile-device docking stand of FIG. 27 with the docking connector of the connector assembly of FIG. 26 rotated frontward.
Figure 27:
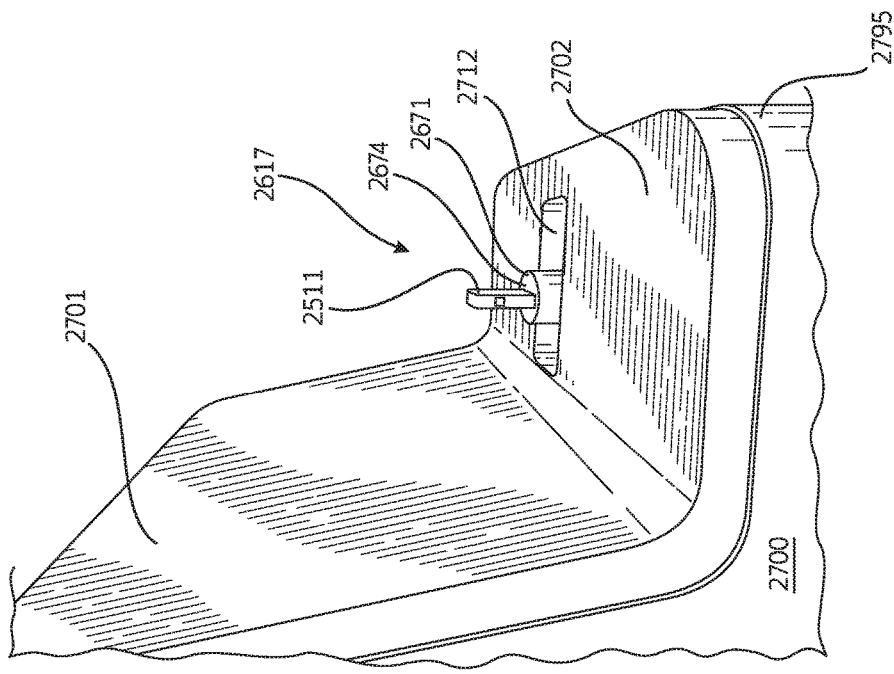
FIG. 27 illustrates a front, left side view of an adjustable mobile-device docking stand with the docking connector of the connector assembly of FIG. 26 in a neutral pivot position.

In many embodiments, the connector assemblies (e.g., 2117 (FIG. 21), 2517 (FIG. 25), and/or 2617 (FIG. 26)) can be part of an adjustable mobile-device docking stand, similar to how connector assembly 1817 (FIG. 18) is part of adjustable mobile-device docking stand 1600, as shown in FIGS. 19-20. Turning ahead in the drawings, FIG. 27 illustrates a front, left side view of an adjustable mobile-device docking stand 2700 with docking connector 2511 of connector assembly 2617 in a neutral pivot position. FIG. 28 illustrates a front, left side view of adjustable mobile-device docking stand 2700 with docking connector 2511 of connector assembly 2617 rotated frontward. Adjustable mobile-device docking stand 2700 is merely exemplary, and embodiments of the adjustable mobile-device docking stand are not limited to embodiments presented herein. The adjustable mobile-device docking stand can be employed in many different embodiments or examples not specifically depicted or described herein. Adjustable mobile-device docking stand 2700 can be similar to adjustable mobile-device docking stand 100 (FIG. 1) and/or adjustable mobile-device docking stand 1600 (FIGS. 16), and various components or constructions of adjustable mobile-device docking stand 2700 can be similar or identical to various components or constructions of adjustable mobile-device docking stand 100 (FIG. 1) and/or adjustable mobile-device docking stand 1600 (FIG. 16).

In a number of embodiments, adjustable mobile-device docking stand 2700 can include a back support surface 2701, a bottom support surface 2702, connector assembly 2617, a connector well 2712, among other components similar to the components of adjustable mobile-device docking stand 100 (FIG. 1) and/or adjustable mobile-device docking stand 1600 (FIG. 16). Back support surface 2701 can be similar or identical to back support surface 101 (FIG. 1) and/or back support surface 1601 (FIG. 16). Bottom support surface 2702 can be similar or identical to bottom support surface 102 (FIG. 1) and/or bottom support surface 1602 (FIG. 16). In many embodiments, adjustable mobile-device docking stand 2700 can include an adjustment mechanism, which can be similar or identical to adjustment wheel 250 (FIG. 2), and/or adjustment wheel 1750 (FIG. 17). In many embodiments, the adjustment mechanism can raise and lower connector assembly 2617 and/or docking connector 2511, such as within connector well 2712. In many embodiments, docking connector 2511 can be configured to attach to a mobile device, such as the mobile devices described above. In several embodiments, back support surface 2701 can be configured to support as back side of the mobile device when the mobile device is connected to docking connector 2511. In some embodiments, bottom support surface 2701 can be configured to support a bottom of the mobile device, of a bottom of a mobile-device case holding the mobile device, when the mobile device is connected to docking connector 2511.

Referring again to FIGS. 27-28, docking connector 2511 can be in a neutral pivot position, as shown in FIG. 27, and can be rotated or pivoted frontward, as shown in FIG. 28, in order to cause ejector 2670 (FIG. 26) to raise sleeve 2671 and push a mobile device (not shown) off of, or at least partially off of, docking connector 2511. In many embodiments, ejector 2670 (FIG. 26) can be configured to push the mobile device fully, or at least partially, off of docking connector 2511 without pushing on a case coupled to the mobile device. For example, sleeve 2671 and/or step 2674 can fit within a docking aperture in the case that is coupled to the mobile device to push on the mobile device instead of the case that is coupled to the mobile device. In other embodiments, ejector 2670 (FIG. 26), such as sleeve 2671 and/or step 2674 can push on a case that is coupled to the mobile device to push the mobile device fully, or at least partially, off of docking connector 2511. In some embodiments, the ejector, such as ejector 2670 (FIG. 26), can include two or more protrusions, which can push on the mobile device. For example, in a number of embodiments, ejector 2670 (FIG. 26), such as sleeve 2671 and/or step 2674 can push on the mobile device using two or more non-continuous points of contact, such as protrusions that contact the mobile device at two or more distinct (e.g., non-continuous) points. In other embodiments, the sleeve (e.g., 2671) can be replaced by another element that at least partially surrounds the docking connector (e.g., 2511) and is configured to push up on a mobile device and/or mobile device case to at least partially push the mobile device off the docking connector (e.g., 2511). For example, the sleeve can be replaced with one or more pins, one or more blades, or other suitable elements.

In many embodiments, adjustable mobile-device docking stand 2700 can have a casing 2795 having sufficient dimension and/or weight distribution to prevent adjustable mobile-device docking stand 2700 from tipping as docking connector 2511 is rotated and/or pivoted frontward. In several embodiments, the positive retention force connecting the mobile device to the docking connector (e.g., 2511) can exceed the force due to the weight of the adjustable mobile-device docking stand (e.g., 2700). For example, in some embodiments, the mating force of docking connector 2511 connecting to the mobile device can be approximately 3 newtons (N), and the weight of adjustable mobile-device docking stand 2700 can be approximately 1 pound (0.45 kilogram), such that lifting on a mobile device connected to docking connector 2511 will also cause adjustable mobile-device docking stand 2700 to be lifted. In order to remove the mobile device with only one hand, and not needing to hold adjustable mobile-device docking stand 2700 down with the other hand, the mobile device can be rotated and/or pivoted frontward, which can cause ejector 2670 (FIG. 26) to push the mobile device fully, or at least partially, off of docking connector 2511. In order for adjustable mobile-device docking stand 2700 to not tip, adjustable mobile-device docking stand 2700 can have a sufficient dimension and/or weight distribution. For example, if adjustable mobile-device docking stand 2700 is approximately 3.75 in (9.525 cm) from front to rear, and docking connector is positioned approximately 0.71 inch (1.88 cm) to approximately 0.79 in (2.0 cm) from the front, a weight distribution of approximately 400 grams in the rear can be sufficient to prevent adjustable mobile-device docking stand 2700 from tipping when docking connector 2511 is rotated or pivoted frontward.

In a number of embodiments, a connector assembly, such as connector assembly 2117 (FIG. 21), connector assembly 2517 (FIG. 25), and/or connector assembly 2617 (FIG. 26) having an ejector, such as ejector 2170 (FIG. 21), ejector 2570 (FIG. 25), and/or ejector 2670 (FIG. 26), can be part of an adjustable mobile-device docking stand, such as shown with connector assembly 2617 in adjustable mobile-device docking stand 2700 in FIGS. 27-28, which can advantageously facilitate removal of a mobile device docked to the adjustable mobile-device docking stand (e.g., 2700) with a single hand by rotating and/or pivoting the mobile device frontward such that the ejector (e.g., 2670) pushes the mobile device at least partially off a docking connector (e.g., 2511) of the adjustable mobile-device docking stand (e.g., 2700). For example, in many embodiments, a user of adjustable mobile-device docking stand 2700 does not need to hold down adjustable mobile-device docking stand 2700 with one hand while pulling up on the mobile device with the other hand, but instead can rotate the mobile device with one hand to remove the mobile device while not using the other hand to touch adjustable mobile-device docking stand 2700. In many embodiments, the ejection of the mobile device can be accomplished without lifting the mobile device upwards and/or pulling the mobile device off the docking connector (e.g., 2511). In a number of embodiments, the ejector (e.g., 2170 (FIG. 21), 2570 (FIG. 25), and/or 2670 (FIG. 26)) can beneficially progressively push the mobile device off the docking connector (e.g., 2111 (FIG. 21), 2511 (FIG. 25-28)) as the mobile device is rotated and/or pivoted frontward, without requiring any stored energy for spring-loaded ejection. In several embodiments, adjustable mobile-device docking stand 2700 can eject the mobile device without a motor or springs pushing off the mobile device. For example, in many embodiments, the ejector (e.g., 2170 (FIG. 21), 2570 (FIG. 25), and/or 2670 (FIG. 26)) does not include any springs, and the ejector is activate simply by rotating the mobile device frontward, without the user needing to push a release button, release a latch, or slide an activator.

Figure 29:
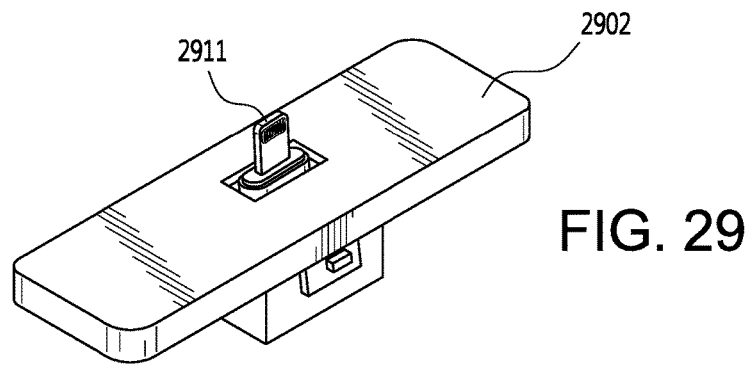
FIG. 29 illustrates a front, top, left side perspective view of a floor and a docking connector, according to another embodiment.
Figure 30:
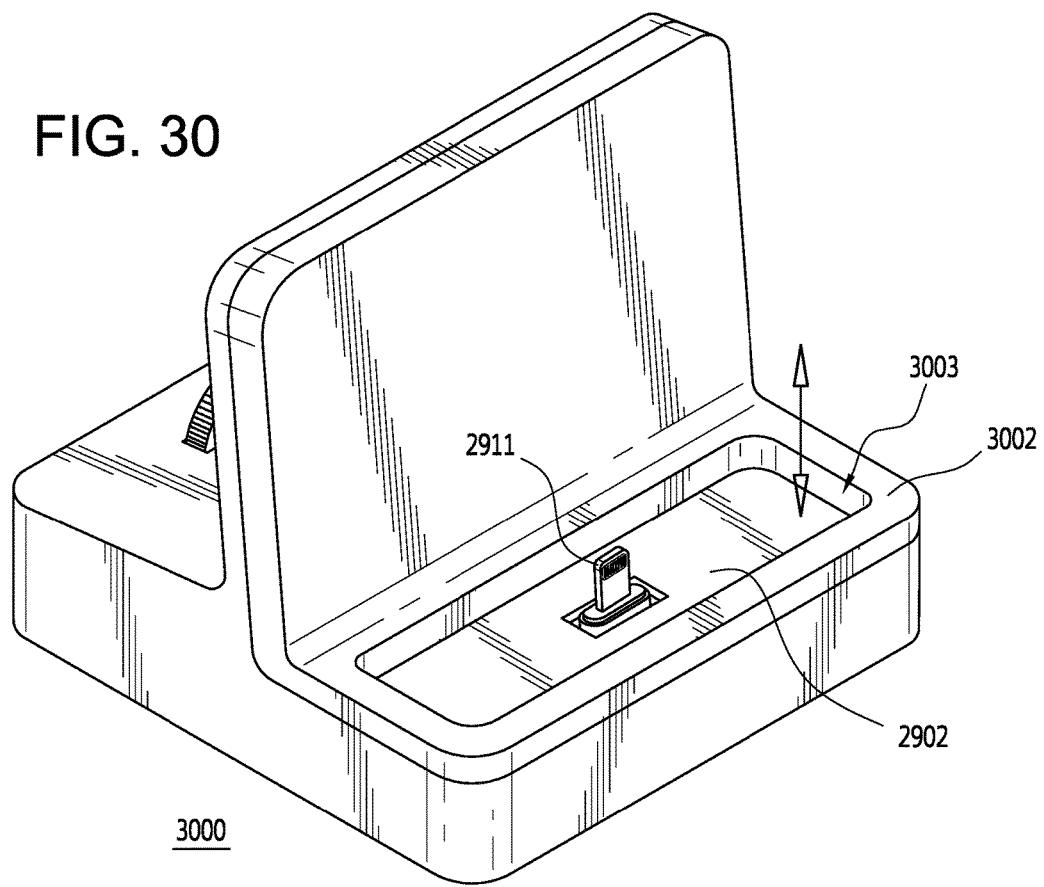
FIG. 30 illustrates a front, top, left side perspective view of a portion of an adjustable mobile-device docking stand, according to another embodiment, which includes the floor and docking connector of FIG. 29.

Turning ahead in the drawings, FIG. 29 illustrates a front, top, left side perspective view of a floor 2902 and a docking connector 2911. FIG. 30 illustrates a front, top, left side perspective view of a portion of an adjustable mobile-device docking stand 3000. FIG. 31 illustrates an exploded front, top, left side perspective view of various components of adjustable mobile-device docking stand 3000, including a floor adjustment sled 3131 and a connector assembly 3117. Adjustable mobile-device docking stand 3000 is merely exemplary, and embodiments of the adjustable mobile-device docking stand are not limited to embodiments presented herein. The adjustable mobile-device docking stand can be employed in many different embodiments or examples not specifically depicted or described herein. Adjustable mobile-device docking stand 3000 can be similar to adjustable mobile-device docking stand 100 (FIG. 1), adjustable mobile-device docking stand 1600 (FIG. 16), and/or adjustable mobile-device docking stand 2700 (FIG. 27), and various components or constructions of adjustable mobile-device docking stand 3000 can be similar or identical to various components or constructions of adjustable mobile-device docking stand 100 (FIG. 1), adjustable mobile-device docking stand 1600 (FIG. 16), and/or adjustable mobile-device docking stand 2700 (FIG. 27).

In many embodiments, adjustable mobile-device docking stand 3000 can include floor 2901, a surrounding bottom surface 3002, and/or docking connector 2911. Docking connector 2911 can be similar or identical to docking connector 111 (FIG. 1), docking connector 1611 (FIG. 16), docking connector 2111 (FIG. 21), and/or docking connector 2511 (FIGS. 25-26). In many embodiments, floor 2901 and/or surrounding bottom surface 3002 can be similar to bottom support surface 2702 (FIG. 27), but floor 2901 can be raised and/or lowered with respect to surrounding bottom surface 3002 and docking connector 2911. In many embodiments, docking connector 2911 can remain in the same position relative to surrounding bottom surface 3002 while floor 2911 is raised and/or lowered.

As shown in FIG. 31, floor 2902 can be raised and/or lowered using an adjustment mechanism, such as adjustment wheel 3150. Adjustment wheel 3150 can be similar or identical to adjustment wheel 250 (FIG. 2) and/or adjustment wheel 1750 (FIG. 17). In many embodiments, adjustment wheel 1750 can be connector to an axle 3130, which can be threaded and connected to floor adjustment sled 3131 at a threaded sled portion 3134, such that rotation of adjustment wheel 1750 and axle 3130 causes floor adjustment sled 3131 to move frontward and/or rearward. In many embodiments, floor adjustment sled 3131 can include one or more sled channels, such as sled channel 3132, which can be similar to sled channel 1822 (FIG. 18).

In a number of embodiments, floor 2902 can be connected to a floor base 3102, which can be structurally confined to raise and lower within a vertical channel, which can be similar to pivot channel 1914 (FIG. 19). In some embodiments, floor base 3102 can include one or more channel alignment tabs, such as channel alignment tab 3103, which can be similar to channel alignment tab 1819 (FIG. 18). In many embodiments, channel alignment tab 3103 can engage with sled channel 3132, such that as adjustment sled 3131 moves frontward and rearward, floor 2902 with raise and lower within the vertical channel that confines floor base 3102. In several embodiments, floor 2902 can support a bottom side of a mobile device, such as the mobile devices described above, so that lowering floor 2902 will allow the bottom side of mobile device to be a lower position within a device recess 3003 surrounded by surrounding bottom surface 3002, as shown in FIG. 30, and raising floor 2902 will allow the bottom of mobile device to be higher position within device recess 3003. In many embodiments, device recess 3003 can have dimensions large enough to accommodate the mobile device fitting within device recess 3003, and/or being able to rotate frontward and rearwards within device recess 3003.

As shown in FIG. 31, in many embodiments, docking connector 2911 can be part of a connector assembly 3117. Connector assembly 3117 can be similar to connector assembly connector assembly 1817 (FIGS. 18-20), connector assembly 2117 (FIG. 21), connector assembly 2517 (FIG. 25) and/or connector assembly 2617 (FIG. 26), and various components or constructions of connector assembly 3117 can be similar or identical to various components or constructions of connector assembly 1817 (FIGS. 18-20), connector assembly 2117 (FIG. 21), connector assembly 2517 (FIG. 25) and/or connector assembly 2617 (FIG. 26). In several embodiments, connector assembly 3117 can include a connector base 3118, an ejector 3170, and/or docking connector 2911. In several embodiments, a stand cable 3107 can be attached to connector assembly 3117. Connector base 3118 can be similar or identical to connector base 2118 (FIG. 21) and/or connector base 2518 (FIG. 25). Ejector 3170 can be similar or identical to ejector 2170 (FIG. 21), ejector 2570 (FIG. 25), and/or ejector 2670 (FIG. 26), and various components or constructions of ejector 3170 can be similar or identical to various components or constructions of ejector 2170 (FIG. 21), ejector 2570 (FIG. 25), and/or ejector 2670 (FIG. 26). For example, ejector 3170 can include a sleeve 3171 and a tab 3172. Sleeve 3171 can be similar or identical to sleeve 2171 (FIG. 21), sleeve 2571 (FIG. 25), and/or sleeve 2671 (FIG. 26). Tab 3172 can be similar or identical to tab 2172 (FIG. 21), tab 2572 (FIG. 25), and/or tab 2672 (FIG. 2). Stand cable 3107 can be similar or identical to stand cable 107 (FIG. 1), stand cable 1707 (FIG. 17), stand cable 2107 (FIG. 21), and/or stand cable 2507 (FIG. 25).

In some embodiments, connector assembly 3117 can allow the mobile device to be ejected automatically by rotating the mobile device frontward. In many embodiments, connector base 3118 can be fixedly connected to a base of adjustable mobile-device docking stand 3000 (FIG. 30) and/or surrounding bottom surface 3002, such that docking connector 2911 remains in the same position while floor 2902 is raised and/or lowered with respect to docking connector 2911. In several embodiments, as floor 2902 raises and/or lowers within device recess 3003 with respect to surrounding bottom surface 3002, differing amounts of docking connector 2911 can be exposed, which can beneficially accommodate mobile devices with docking ports in differing positions and/or cases with varying thicknesses which are coupled to the mobile devices. For example, if the mobile device has the docking port on the bottom of the mobile device and the mobile device is not in a case, floor 2902 can be raised shorten the exposed length of docking connector 2911 above floor 2902, such that the mobile device can be docked to docking connector 2911 and the bottom of the mobile device can be supported by floor 2902. As another example, if the mobile device is in a thick case, floor 2902 can be lowered to lengthen the exposed length of docking connector above floor 2902, such that the mobile device can be docked to docking connector 2911 and the bottom of the case in which the mobile device is coupled can be supported by floor 2902. In a number of embodiments, adjustable mobile-device docking stand 3000 (FIG. 30) can decouple the adjustment of the exposed length of docking connector 2911 from connector assembly 3117, which can provide additional stability to connector assembly 3117 and docking connector 2911, as connector base 3118 can be fixedly connected to a base of adjustable mobile-device docking stand 3000 (FIG. 30).

Proceeding to the next drawing, FIG. 32 illustrates a front, top, left side perspective view of an adjustable mobile-device docking stand 3200 with a side ejector 3220. FIG. 33 illustrates a front view of side ejector 3220. Adjustable mobile-device docking stand 3200 is merely exemplary, and embodiments of the adjustable mobile-device docking stand are not limited to embodiments presented herein. The adjustable mobile-device docking stand can be employed in many different embodiments or examples not specifically depicted or described herein. Adjustable mobile-device docking stand 3200 can be similar to adjustable mobile-device docking stand 100 (FIG. 1), adjustable mobile-device docking stand 1600 (FIG. 16), adjustable mobile-device docking stand 2700 (FIG. 27), and/or adjustable mobile-device docking stand 3000 (FIG. 30), and various components or constructions of adjustable mobile-device docking stand 3200 can be similar or identical to various components or constructions of adjustable mobile-device docking stand 100 (FIG. 1), adjustable mobile-device docking stand 1600 (FIG. 16), adjustable mobile-device docking stand 2700 (FIG. 27), and/or adjustable mobile-device docking stand 3000 (FIG. 30).

In a number of embodiments, adjustable mobile-device docking stand 3200 can include a back support surface 3201, a bottom support surface 3202, a front 3203, sides, such as side 3204, a docking connector 3211, and/or one or more side ejectors, such as side ejector 3220. Back support surface 3201 can be similar or identical to back support surface 101 (FIG. 1), back support surface 1601 (FIG. 16), and/or back support surface 2701 (FIG. 27). Bottom support surface 3202 can be similar or identical to bottom support surface 102 (FIG. 1), bottom support surface 1602 (FIG. 16), and/or bottom support surface 2702 (FIG. 27). Front 3203 can be similar or identical to front 103 (FIG. 1), and/or front 1603 (FIG. 16). Docking connector 3211 can be similar or identical to docking connector 111 (FIG. 1), docking connector 1611 (FIG. 16), docking connector 2111 (FIG. 21), docking connector 2511 (FIG. 25), and/or docking connector 2911 (FIG. 29). In many embodiments, docking connector 3211 can be raised and lowered with respect to bottom support surface 3202, similarly as described above, and/or can dock with a mobile device, which can be similar to the mobile devices described above.

In several embodiments, one or more side ejectors, such as side ejector 3220, can be used to eject a mobile device fully, or at least partially, off of docking ejector 3211. In many embodiments, side ejector 3220 can include a side button 3221, a top ejecting piece 3222, and a pivot 3323 (FIG. 33). In a number of embodiments, side button 3221 can be position at side 3204. In various embodiments, top ejecting piece 3222 can be positioned at bottom support surface 3202. In some embodiments, pivot 3323 (FIG. 33) can be pivotally connected to a base of adjustable mobile-device docking stand 3200, such that when side button 3221 is pushed inwards, side ejector 3220 rotates about pivot 3323 (FIG. 33) and pushes top ejecting piece 3222 upwards, which can eject the mobile device fully, or at least partially, off of docking connector 3211. In some embodiments, a side ejector (e.g., 3220) can be located at each side (e.g., 3204) of adjustable mobile-device docking stand 3200, so that each of the side buttons (e.g., 3221) can be pushed inward simultaneously to push up each of top ejecting pieces 3222.

Figure 34:
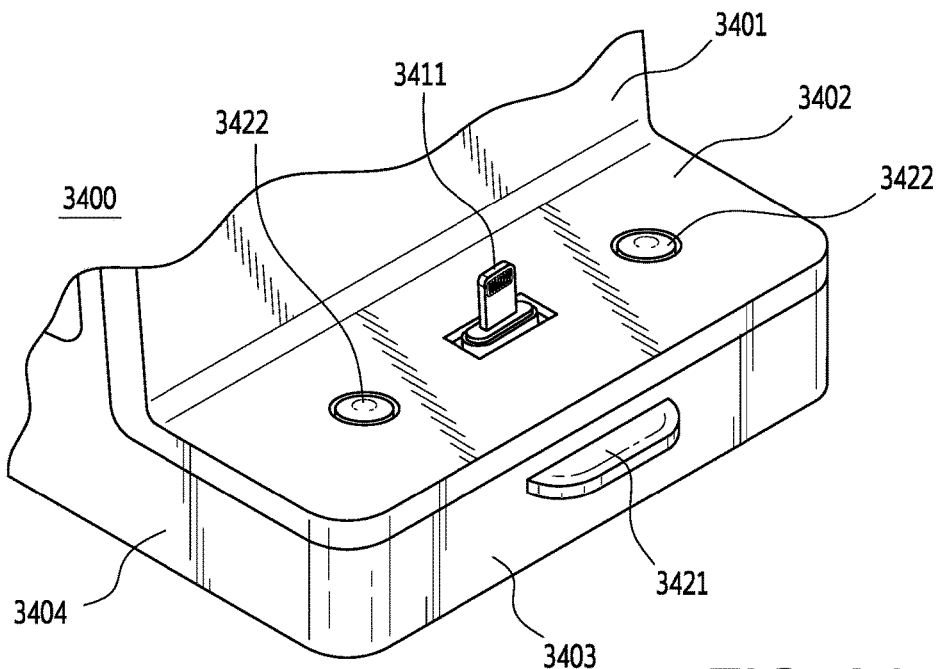
FIG. 34 illustrates a front, top, left side perspective view of an adjustable mobile-device docking stand, according to another embodiment.
Figure 35:
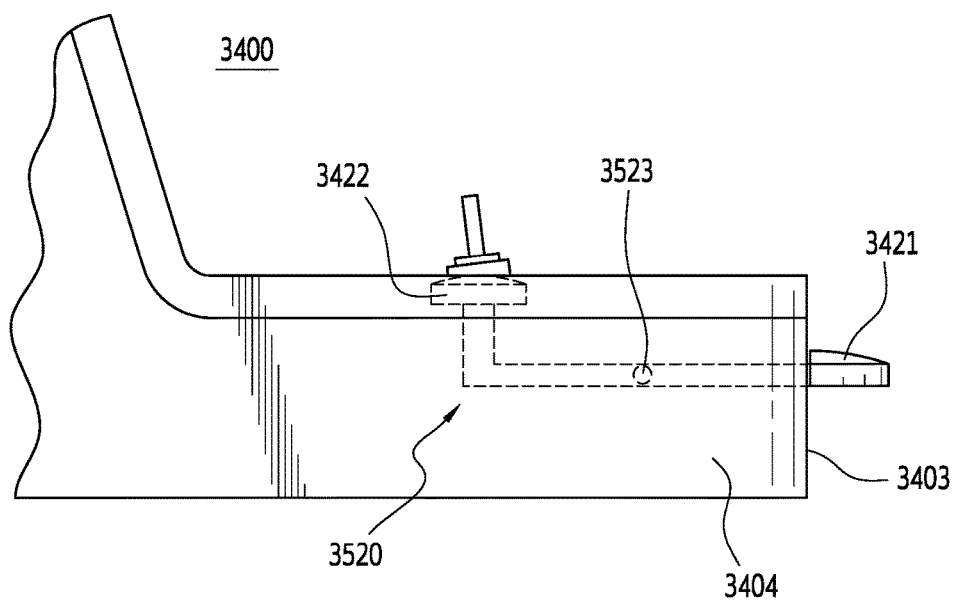
FIG. 35 illustrates a side view of the adjustable mobile-device docking stand of FIG. 34, showing a front ejector.

Turning ahead in the drawings, FIG. 34 illustrates a front, top, left side perspective view of an adjustable mobile-device docking stand 3400. FIG. 35 illustrates a side view of adjustable mobile-device docking stand 3400, showing a front ejector 3520. Adjustable mobile-device docking stand 3400 is merely exemplary, and embodiments of the adjustable mobile-device docking stand are not limited to embodiments presented herein. The adjustable mobile-device docking stand can be employed in many different embodiments or examples not specifically depicted or described herein. Adjustable mobile-device docking stand 3400 can be similar to adjustable mobile-device docking stand 100 (FIG. 1), adjustable mobile-device docking stand 1600 (FIG. 16), adjustable mobile-device docking stand 2700 (FIG. 27), adjustable mobile-device docking stand 3000 (FIG. 30), and/or adjustable mobile-device docking stand 3200 (FIG. 32), and various components or constructions of adjustable mobile-device docking stand 3400 can be similar or identical to various components or constructions of adjustable mobile-device docking stand 100 (FIG. 1), adjustable mobile-device docking stand 1600 (FIG. 16), adjustable mobile-device docking stand 2700 (FIG. 27), adjustable mobile-device docking stand 3000 (FIG. 30), and/or adjustable mobile-device docking stand 3200 (FIG. 32).

In a number of embodiments, adjustable mobile-device docking stand 3400 can include a back support surface 3401, a bottom support surface 3402, a front 3403, sides, such as side 3404, a docking connector 3411, and/or one or more front ejectors, such as front ejector 3520 (FIG. 35). Back support surface 3401 can be similar or identical to back support surface 101 (FIG. 1), back support surface 1601 (FIG. 16), back support surface 2701 (FIG. 27), and/or back support surface 3201 (FIG. 32). Bottom support surface 3402 can be similar or identical to bottom support surface 102 (FIG. 1), bottom support surface 1602 (FIG. 16), bottom support surface 2702 (FIG. 27), and/or bottom support surface 3203 (FIG. 32). Front 3403 can be similar or identical to front 103 (FIG. 1), front 1603 (FIG. 16), and/or front 3203 (FIG. 32). Side 3404 can be similar or identical to side 3204 (FIG. 32). Docking connector 3411 can be similar or identical to docking connector 111 (FIG. 1), docking connector 1611 (FIG. 16), docking connector 2111 (FIG. 21), docking connector 2511 (FIG. 25), docking connector 2911 (FIG. 29), and/or docking connector 3211 (FIG. 32). In many embodiments, docking connector 3411 can be raised and lowered with respect to bottom support surface 3402, similarly as described above, and/or can dock with a mobile device, which can be similar to the mobile devices described above.

As shown in FIG. 35, in several embodiments, one or more front ejectors, such as front ejector 3520, can be used to eject a mobile device fully, or at least partially, off of docking ejector 3411. In many embodiments, front ejector 3520 can include a front button 3421, a top ejecting piece 3422, and a pivot 3523. In a number of embodiments, front button 3421 can be positioned at front 3403. In various embodiments, top ejecting piece 3422 can be positioned at bottom support surface 3402. In some embodiments, pivot 3523 can be pivotally connected to a base of adjustable mobile-device docking stand 3400, such that when front button 3421 is pushed downwards, front ejector 3520 rotates about pivot 3523 and pushes top ejecting piece 3422 upwards, which can eject the mobile device fully, or at least partially, off of docking connector 3411. In some embodiments, front ejector 3520 can be connected to one or more top ejecting pieces, such as top ejecting pieces 3422, so that depressing front button 3421 can be result in each of top ejecting pieces 3422 pushing the mobile device upwards.

Figure 36:
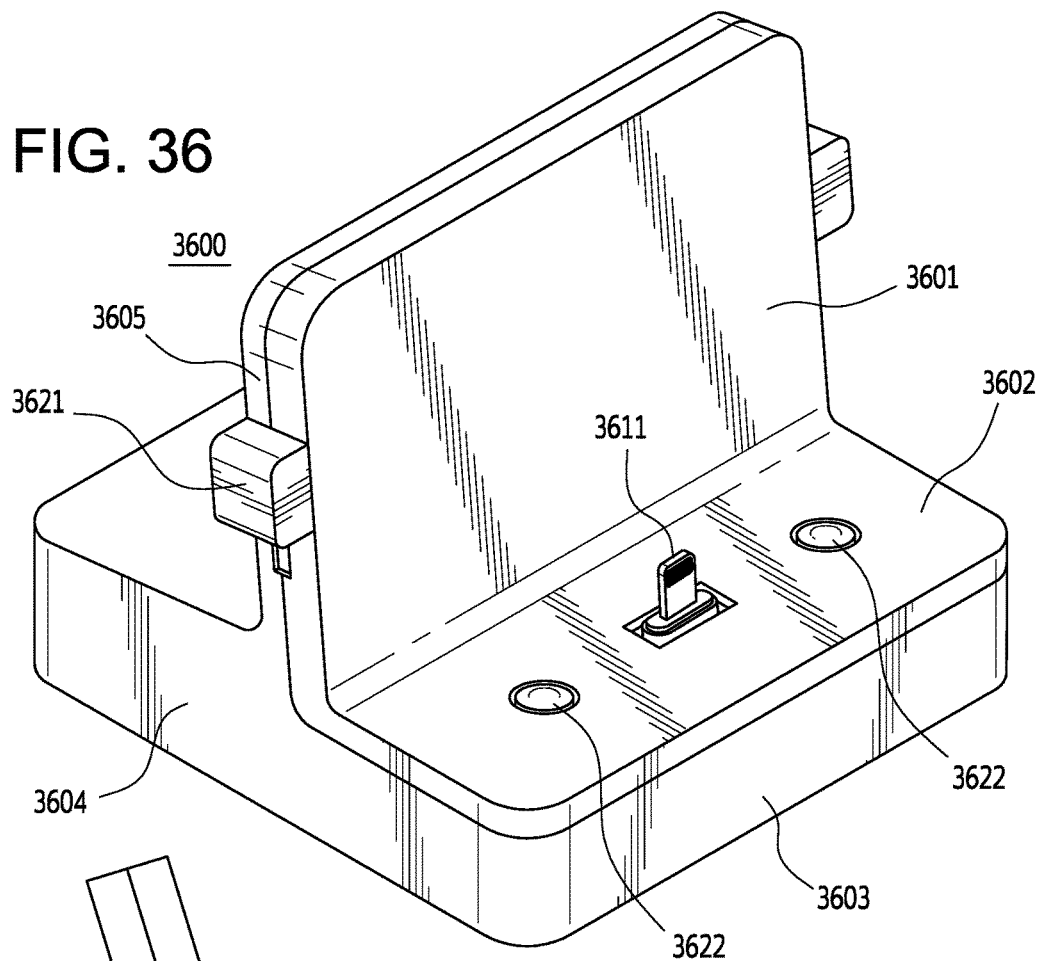
FIG. 36 illustrates a front, top, left side perspective view of an adjustable mobile-device docking stand, which includes side slides, according to another embodiment.
Figure 37:
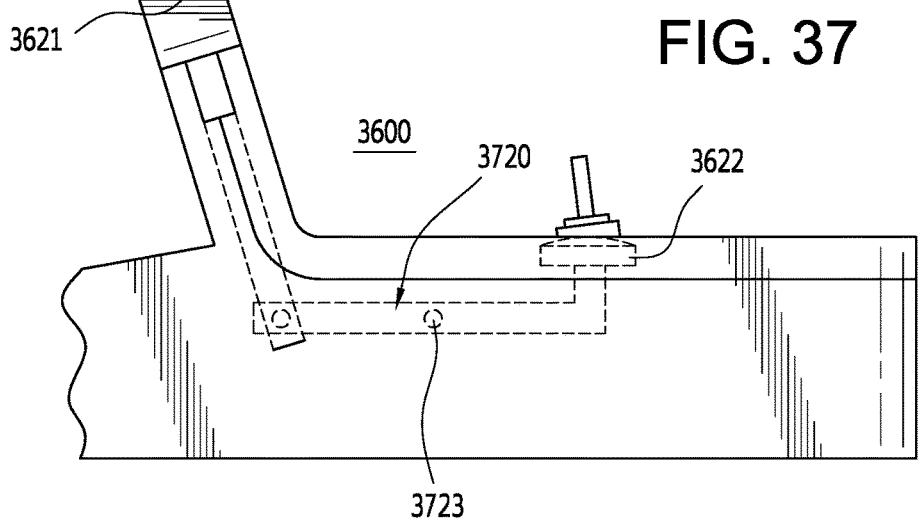
FIG. 37 illustrates a front view of a side ejector included in the adjustable mobile device docking stand of FIG. 36.

Proceeding to the next drawing, FIG. 36 illustrates a front, top, left side perspective view of an adjustable mobile-device docking stand 3600, which includes side slides 3621. FIG. 37 illustrates a front view of a side ejector 3720 included in adjustable mobile-device docking stand 3600. Adjustable mobile-device docking stand 3600 is merely exemplary, and embodiments of the adjustable mobile-device docking stand are not limited to embodiments presented herein. The adjustable mobile-device docking stand can be employed in many different embodiments or examples not specifically depicted or described herein. Adjustable mobile-device docking stand 3600 can be similar to adjustable mobile-device docking stand 100 (FIG. 1), adjustable mobile-device docking stand 1600 (FIG. 16), adjustable mobile-device docking stand 2700 (FIG. 27), adjustable mobile-device docking stand 3000 (FIG. 30), adjustable mobile-device docking stand 3200 (FIG. 32), and/or adjustable mobile-device docking stand 3400 (FIG. 34), and various components or constructions of adjustable mobile-device docking stand 3600 can be similar or identical to various components or constructions of adjustable mobile-device docking stand 100 (FIG. 1), adjustable mobile-device docking stand 1600 (FIG. 16), adjustable mobile-device docking stand 2700 (FIG. 27), adjustable mobile-device docking stand 3000 (FIG. 30), adjustable mobile-device docking stand 3200 (FIG. 32), and/or adjustable mobile-device docking stand 3400 (FIG. 34).

In a number of embodiments, adjustable mobile-device docking stand 3600 can include a back support surface 3601, a bottom support surface 3602, a front 3603, sides, such as side 3604, back support sides, such as back support side 3605, a docking connector 3611, and/or one or more side ejectors, such as side ejectors 3720 (as fully shown in FIG. 37 and described below, and portions of which are shown in FIG. 36, including side slides 3621 and top ejecting pieces 3622). Back support surface 3601 can be similar or identical to back support surface 101 (FIG. 1), back support surface 1601 (FIG. 16), back support surface 2701 (FIG. 27), back support surface 3201 (FIG. 32), and/or back support surface 3401 (FIG. 34). Bottom support surface 3602 can be similar or identical to bottom support surface 102 (FIG. 1), bottom support surface 1602 (FIG. 16), bottom support surface 2702 (FIG. 27), bottom support surface 3203 (FIG. 32), and/or bottom support surface 3403 (FIG. 34). Front 3603 can be similar or identical to front 103 (FIG. 1), front 1603 (FIG. 16), front 3203 (FIG. 32), and/or front 3403 (FIG. 34). Side 3604 can be similar or identical to side 3204 (FIG. 32) and/or side 3404 (FIG. 34). Docking connector 3611 can be similar or identical to docking connector 111 (FIG. 1), docking connector 1611 (FIG. 16), docking connector 2111 (FIG. 21), docking connector 2511 (FIG. 25), docking connector 2911 (FIG. 29), docking connector 3211 (FIG. 32), and/or docking connector 3411 (FIG. 34). In many embodiments, docking connector 3611 can be raised and lowered with respect to bottom support surface 3602, similarly as described above, and/or can dock with a mobile device, which can be similar to the mobile devices described above.

As shown in FIG. 37, in several embodiments, one or more side ejectors, such as side ejector 3720, can be used to eject a mobile device fully, or at least partially, off of docking ejector 3611. In many embodiments, side ejector 3720 can include side slide 3621, top ejecting piece 3622, and a pivot 3723. In a number of embodiments, side slide 3621 can be positioned at back support side 3605, which can be at a side of back support surface 3601. In various embodiments, top ejecting piece 3622 can be positioned at bottom support surface 3602. In some embodiments, pivot 3723 can be pivotally connected to a base of adjustable mobile-device docking stand 3600, such that when side slide 3621 is pushed downwards, side ejector 3720 rotates about pivot 3723 and pushes top ejecting piece 3622 upwards, which can eject the mobile device fully, or at least partially, off of docking connector 3611. In some embodiments, a side ejector (e.g., 3720) can be located at each side (e.g., 3604 (FIG. 36)) of adjustable mobile-device docking stand 3700, so that each of the side slides (e.g., 3621) can be depressed simultaneously to push up each of top ejecting pieces 3622.

Figure 38:
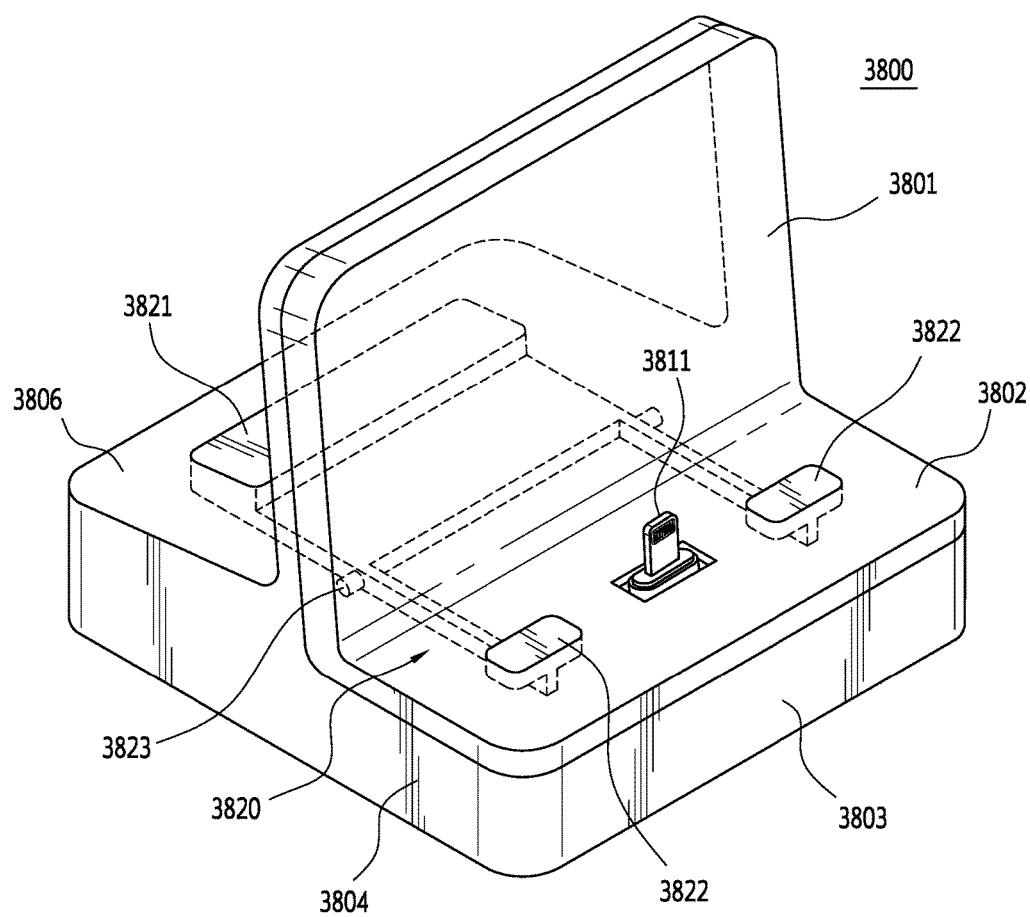
FIG. 38 illustrates a front, top, left side perspective view of an adjustable mobile-device docking stand, which includes rear ejector, according to another embodiment.

Proceeding to the next drawing, FIG. 38 illustrates a front, top, left side perspective view of an adjustable mobile-device docking stand 3800, which includes rear ejector 3820. Adjustable mobile-device docking stand 3800 is merely exemplary, and embodiments of the adjustable mobile-device docking stand are not limited to embodiments presented herein. The adjustable mobile-device docking stand can be employed in many different embodiments or examples not specifically depicted or described herein. Adjustable mobile-device docking stand 3800 can be similar to adjustable mobile-device docking stand 100 (FIG. 1), adjustable mobile-device docking stand 1600 (FIG. 16), adjustable mobile-device docking stand 2700 (FIG. 27), adjustable mobile-device docking stand 3000 (FIG. 30), adjustable mobile-device docking stand 3200 (FIG. 32), adjustable mobile-device docking stand 3400 (FIG. 34), and/or adjustable mobile-device docking stand 3600 (FIG. 36), and various components or constructions of adjustable mobile-device docking stand 3800 can be similar or identical to various components or constructions of adjustable mobile-device docking stand 100 (FIG. 1), adjustable mobile-device docking stand 1600 (FIG. 16), adjustable mobile-device docking stand 2700 (FIG. 27), adjustable mobile-device docking stand 3000 (FIG. 30), adjustable mobile-device docking stand 3200 (FIG. 32), adjustable mobile-device docking stand 3400 (FIG. 34), and/or adjustable mobile-device docking stand 3600 (FIG. 36).

In a number of embodiments, adjustable mobile-device docking stand 3800 can include a back support surface 3801, a bottom support surface 3802, a front 3803, sides, such as side 3804, a rear 3806, a docking connector 3811, and/or one or more rear ejectors, such as rear ejector 3820. Back support surface 3801 can be similar or identical to back support surface 101 (FIG. 1), back support surface 1601 (FIG. 16), back support surface 2701 (FIG. 27), back support surface 3201 (FIG. 32), back support surface 3401 (FIG. 34), and/or back support surface 3601 (FIG. 36). Bottom support surface 3802 can be similar or identical to bottom support surface 102 (FIG. 1), bottom support surface 1602 (FIG. 16), bottom support surface 2702 (FIG. 27), bottom support surface 3203 (FIG. 32), bottom support surface 3403 (FIG. 34), and/or bottom support surface 3603 (FIG. 36). Front 3803 can be similar or identical to front 103 (FIG. 1), front 1603 (FIG. 16), front 3203 (FIG. 32), front 3403 (FIG. 34), and/or front 3603 (FIG. 36). Side 3804 can be similar or identical to side 3204 (FIG. 32) side 3404 (FIG. 34), and/or side 3604 (FIG. 36). Rear 3806 can be similar or identical to rear 106 (FIG. 1) and/or rear 1706 (FIG. 17). Docking connector 3811 can be similar or identical to docking connector 111 (FIG. 1), docking connector 1611 (FIG. 16), docking connector 2111 (FIG. 21), docking connector 2511 (FIG. 25), docking connector 2911 (FIG. 29), docking connector 3211 (FIG. 32), docking connector 3411 (FIG. 34), and/or docking connector 3611 (FIG. 36). In many embodiments, docking connector 3811 can be raised and lowered with respect to bottom support surface 3802, similarly as described above, and/or can dock with a mobile device, which can be similar to the mobile devices described above.

In several embodiments, one or more rear ejectors, such as rear ejector 3820, can be used to eject a mobile device fully, or at least partially, off of docking ejector 3811. In many embodiments, rear ejector 3820 can include a rear button 3821, one or more top ejecting pieces 3822, and a pivot 3823. In a number of embodiments, rear button 3821 can be positioned at rear 3806, which can be at a rear of back support surface 3801. In various embodiments, top ejecting piece 3822 can be positioned at bottom support surface 3802. In some embodiments, pivot 3823 can be pivotally connected to a base of adjustable mobile-device docking stand 3800, such that when rear button 3821 is pushed downwards, rear ejector 3820 rotates about pivot 3823 and pushes top ejecting pieces 3822 upwards, which can eject the mobile device fully, or at least partially, off of docking connector 3811. In some embodiments, rear ejector 3820 can be connected to multiple top ejecting pieces, such as top ejecting pieces 3822, so that depressing rear button 3821 can be result in each of top ejecting pieces 3822 pushing the mobile device upwards.

In a number of embodiments, placement of the ejector actuators (e.g., side button 3221 (FIG. 32), front button 3421 (FIG. 34), side slide 3621 (FIG. 36), rear button 3821 (FIG. 38)) can beneficially facilitate one-hand actuation of the ejector (e.g., side ejector 3220 (FIG. 32), front ejector 3520 (FIG. 35), side ejector 3720 (FIG. 37), rear ejector 3820 (FIG. 38)) while removing the mobile device with the same hand, as a single-handed operation. In some embodiments, ejector (e.g., side ejector 3220 (FIG. 32), front ejector 3520 (FIG. 35), side ejector 3720 (FIG. 37), rear ejector 3820 (FIG. 38)) can be spring biased such that the top ejecting pieces (e.g., top ejecting pieces 3222 (FIG. 32), top ejecting pieces 3422 (FIG. 34), top ejecting pieces 3622 (FIG. 36), top ejecting pieces 3822 (FIG. 38)) stay up until the mobile device is pushed downward and docked on the docking connector (e.g., docking connector 3211 (FIG. 32), docking connector 3411 (FIG. 34), docking connector 36 (FIG. 36), docking connector 3811 (FIG. 38)).

Figure 39:
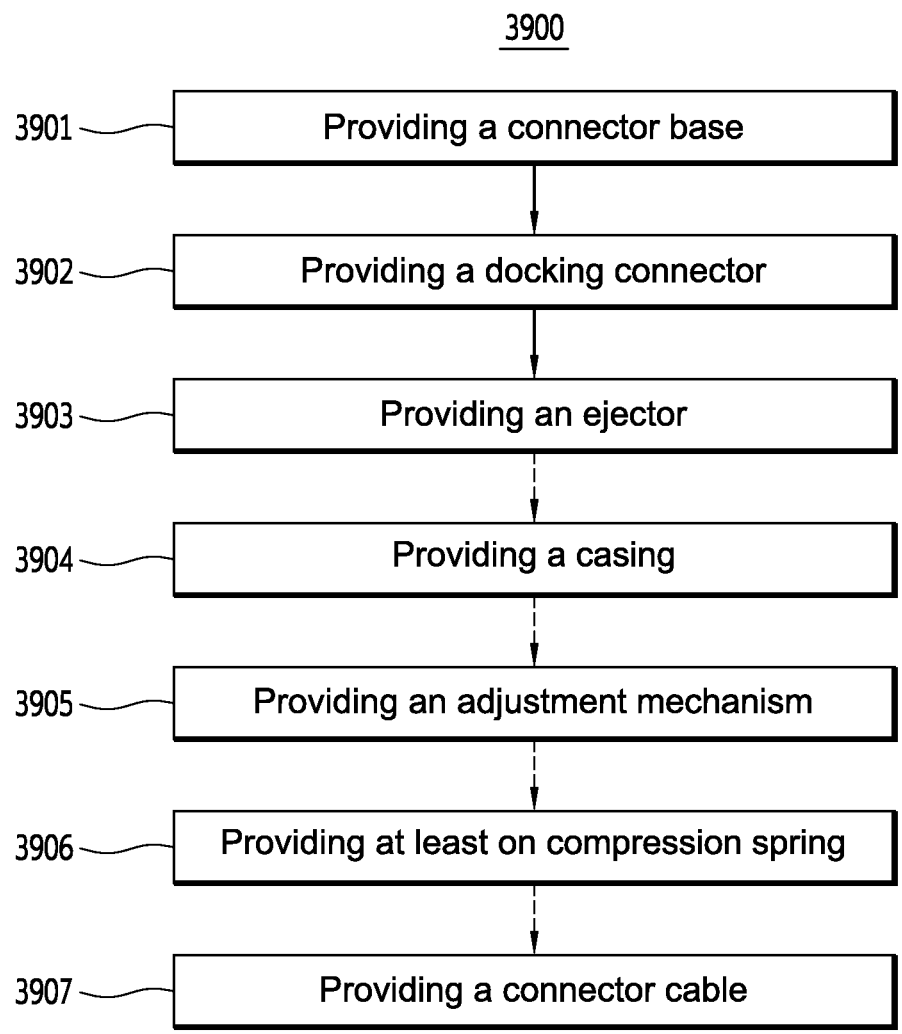
FIG. 39 illustrates a flow chart for an embodiment of a method, according to another embodiment.

Turning ahead in the drawings, FIG. 39 illustrates a flow chart for an embodiment of a method 3900. In many embodiments, method 3900 can be a method of providing a charging stand. Method 3900 is merely exemplary and is not limited to the embodiments presented herein. Method 3900 can be employed in many different embodiments or examples not specifically depicted or described herein. In some embodiments, the procedures, the processes, and/or the activities of method 3900 can be performed in the order presented. In other embodiments, the procedures, the processes, and/or the activities of the method 3900 can be performed in any other suitable order. In still other embodiments, one or more of the procedures, the processes, and/or the activities in method 3900 can be combined or skipped. In some embodiments, the charging stand can be similar or identical to adjustable mobile-device docking stand 2700 (FIG. 27) and/or adjustable mobile-device docking stand 3000 (FIG. 30).

Referring to FIG. 39, method 3900 can include a block 3901 of providing a connector base. In many embodiments, the connector base can be similar or identical to connector base 2118 (FIG. 28), connector base 2518 (FIGS. 25-26), and/or connector base 3118 (FIG. 31).

In some embodiments, method 3900 also can include a block 3902 of providing a docking connector. In several embodiments, the docking connector can be similar or identical to docking connector 111 (FIG. 1), docking connector 1611 (FIG. 16), docking connector 2111 (FIG. 21), docking connector 2511 (FIG. 25), docking connector 2911 (FIG. 29), docking connector 3211 (FIG. 32), docking connector 3411 (FIG. 34), docking connector 3611 (FIG. 36), and/or docking connector 3811 (FIG. 38). In many embodiments, the docking connector can be pivotally coupled to the connector base and configured to be removably coupled to an electronic device. The electronic device can be one of the mobile devices described above.

In a number of embodiments, method 3900 additionally can include a block 3903 of providing an ejector. In some embodiments, the ejector can be similar or identical to ejector 2170 (FIG. 21), ejector 2570 (FIG. 25), ejector 2670 (FIG. 26), and/or ejector 3170 (FIG. 31). In many embodiments, the ejector can at least partially surrounding the docking connector and can be configured to push the electronic device at least partially off the docking connector when the docking connector is rotated in a first direction relative to the connector base. In many embodiments, the first direction can be in a frontward direction, as described above. In other embodiments, the first direction can be in another suitable direction, such as a rear direction or sideways direction. In a number of embodiments, the ejector can be configured to move away from a pivot point of the docking connector as the electronic device is rotated in the first direction relative to the connector base. The pivot point can be similar or identical to connector assembly pivot 813 (FIG. 8), connector assembly pivot 1813 (FIG. 18), and/or connector assembly pivot 2113 (FIG. 21).

In several embodiments, block 3903 of providing an ejector can include providing the ejection such that the ejector includes a sleeve at least partially surrounding the docking connector, and such that the ejector includes a tab extending from the sleeve to a first point of the connector base and being slidable with respect to the first point of the connector base such that the tab slides along the first point of the connector base and pushes the sleeve along the docking connector outward from the connector base as the docking connector is rotated in the first direction with respect to the connector base. The sleeve can be similar or identical to sleeve 2171 (FIG. 21), sleeve 2571 (FIG. 25), sleeve 2671 (FIG. 26), and/or sleeve 3171 (FIG. 31). The tab can be similar or identical to tab 2172 (FIG. 21), tab 2572 (FIG. 25), tab 2672 (FIG. 2), and/or tab 3172 (FIG. 31). The first point can be similar or identical to ejector connection point 2180 (FIG. 21) on connector base 2118 (FIG. 21). In some embodiments, the connector base can include a slot at the first point of the connector base. The slot can be similar or identical to slot 2181 (FIG. 21). In many embodiments, the tab can be configured to slide through the slot as the docking connector is rotated in the first direction with respect to the connector base. In several embodiments, the sleeve can have at least one narrowing step. The narrowing step can be similar or identical to step 2673 (FIG. 26) and/or step 2674 (FIG. 26).

In some embodiments, the ejector can include a gusset at a connection between the sleeve and the tab. The gusset can be similar or identical to gusset 2173 (FIG. 21). In some embodiments, the docking connector can have a neutral pivot position at approximately 5 degrees to approximately 20 degrees from vertical in a direction opposite the first direction. For example, the neutral pivot position can be similar or identical to the neutral pivot position shown for docking connector 2111 in FIG. 22 and/or shown for docking connector 2511 in FIG. 27.

In some embodiments, the docking connector can be configured to rotate in the first direction for a predetermined angular rotation from the neutral pivot position before the ejector pushes the electronic device at least partially off the docking connector. For example, the predetermined angular rotation can be the "slack" in rotation described above, which in some embodiments can be approximately 5 degrees to approximately 10 degrees. In a number of embodiments, the ejector can be configured to push the electronic device at least partially off the docking connector without pushing on a case coupled to the electronic device when the electronic device is coupled to the docking connector. In several embodiments, the ejector can be configured to push on the electronic device using two or more non-continuous points of contact, such as the non-continuous protrusions described above.

In many embodiments, method 3900 optionally can include a block 3904 of providing a casing. The casing can be similar or identical to adjustable mobile-device docking stand 100 (FIG. 1), adjustable mobile-device docking stand 1600 (FIG. 16), adjustable mobile-device docking stand 2700 (FIG. 27), adjustable mobile-device docking stand 3000 (FIG. 30), adjustable mobile-device docking stand 3200 (FIG. 32), adjustable mobile-device docking stand 3400 (FIG. 34), adjustable mobile-device docking stand 3600 (FIG. 36), and/or adjustable mobile-device docking stand 3800 (FIG. 38), or components thereof beyond the connector base, the docking connector, and the ejector. In a number of embodiments, the casing can include a surface. The surface can be similar or identical to bottom support surface 102 (FIG. 1), bottom support surface 1602 (FIG. 16), bottom support surface 2702 (FIG. 27), bottom support surface 3203 (FIG. 32), bottom support surface 3403 (FIG. 34), bottom support surface 3603 (FIG. 36), and/or bottom support surface 3803 (FIG. 38). In many embodiments, the surface can be configured to support a bottom side of the electronic device when the electronic device is coupled to the docking connector. In some embodiments, the casing can have sufficient dimension and weight distribution to prevent the charging stand from tipping as the docking connector is rotated in the first direction relative to the connector base.

In many embodiments, method 3900 optionally can include a block 3905 of providing an adjustment mechanism. The adjustment mechanism can be similar or identical to adjustment wheel 250 (FIG. 2), adjustment wheel 1750 (FIG. 17), and/or adjustment wheel 3150 (FIG. 31). In some embodiments, the adjustment mechanism can be configured to adjust a position of the connector base and docking connector relative to the surface. For example, in some embodiments, the adjustment mechanism can be configured to adjust a position of the connector base and docking connector relative to the surface by raising and/or lowering the docking connector relative to the connector base. In other embodiments, the adjustment mechanism can be configured to adjust a position of the connector base and docking connector relative to the surface by raising and/or lowering the surface within the casing, such as shown in FIGS. 29-31 and described above.

In many embodiments, method 3900 optionally can include a block 3906 of providing at least one compression spring. The compression spring can be similar or identical to front compression spring 1961 (FIG. 19) and/or rear compression spring 1962 (FIG. 19). In some embodiments, the at least one compression spring can be configured to adjust a rotational position of the docking connector.

In many embodiments, method 3900 optionally can include a block 3907 of providing a connector cable. The connector cable can be similar or identical to stand cable 107 (FIG. 1), stand cable 1707 (FIG. 17), stand cable 2107 (FIG. 21), stand cable 2507 (FIG. 25), and/or stand cable 3107 (FIG. 31). In some embodiments, the connector cable can be electrically coupled to the docking connector. The a number of embodiments, the connector cable can be configured to pass through a pivot point of the docking connector. The pivot point can be similar or identical to connector assembly pivot 1813 (FIG. 18), and/or connector assembly pivot 2113 (FIG. 21)

Although the adjustable mobile-device docking stand has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that various elements of FIGS. 1-39 may be modified, and that the foregoing discussion of certain of these embodiments does not necessarily represent a complete description of all possible embodiments. As another example, one or more of the procedures, processes, or activities of FIGS. 15 and 39 may include different procedures, processes, and/or activities and be performed in many different orders, and/or one or more of the procedures, processes, or activities of FIGS. 15 and 39 may include one or more of the procedures, processes, or activities of the other one of FIGS. 15 and 39.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A charging stand comprising:
a connector base;
a docking connector pivotally coupled to the connector base and configured to be removably coupled to an electronic device;
an ejector at least partially surrounding the docking connector and configured to push the electronic device at least partially off the docking connector when the docking connector is rotated in a first direction relative to the connector base; and
a connector cable electrically coupled to the docking connector, the connector cable being configured to pass through a pivot point of the docking connector.

2. The charging stand of claim 1, wherein:
the ejector is configured to move away from the pivot point of the docking connector as the electronic device is rotated in the first direction relative to the connector base.

3. The charging stand of claim 1 further comprising:
a casing comprising a surface, the surface being configured to support a bottom side of the electronic device when the electronic device is coupled to the docking connector.

4. The charging stand of claim 3 further comprising:
an adjustment mechanism configured to adjust a position of the connector base and docking connector relative to the surface.

5. The charging stand of claim 4, wherein:
the adjustment mechanism is configured to adjust a position of the connector base and docking connector relative to the surface by lowering the surface within the casing.

6. The charging stand of claim 1 further comprising:
at least one compression spring configured to adjust a rotational position of the docking connector.

7. The charging stand of claim 1, wherein:
the docking connector has a neutral pivot position at approximately 5 degrees to approximately 20 degrees from vertical in a direction opposite the first direction.

8. The charging stand of claim 1 further comprising:
a casing having sufficient dimension and weight distribution to prevent the charging stand from tipping as the docking connector is rotated in the first direction relative to the connector base.

9. The charging stand of claim 1, wherein:
the ejector is configured to push on the electronic device using two or more non-continuous points of contact.

10. A charging stand comprising:
a connector base;
a docking connector pivotally coupled to the connector base and configured to be removably coupled to an electronic device; and
an ejector at least partially surrounding the docking connector and configured to push the electronic device at least partially off the docking connector when the docking connector is rotated in a first direction relative to the connector base,
wherein:
the ejector comprises:
a sleeve at least partially surrounding the docking connector; and
a tab extending from the sleeve to a first point of the connector base and being slidable with respect to the first point of the connector base such that the tab slides along the first point of the connector base and pushes the sleeve along the docking connector outward from the connector base as the docking connector is rotated in the first direction with respect to the connector base.

11. The charging stand of claim 10, wherein:
the sleeve has at least one narrowing step.

12. The charging stand of claim 10, wherein:
the ejector further comprises a gusset at a connection between the sleeve and the tab.

13. The charging stand of claim 10, wherein:
the connector base comprises a slot at the first point of the connector base; and
the tab is configured to slide through the slot as the docking connector is rotated in the first direction with respect to the connector base.

14. A charging stand comprising:
a connector base;
a docking connector pivotally coupled to the connector base and configured to be removably coupled to an electronic device; and
an ejector at least partially surrounding the docking connector and configured to push the electronic device at least partially off the docking connector when the docking connector is rotated in a first direction relative to the connector base,
wherein:
the docking connector has a neutral pivot position at approximately 5 degrees to approximately 20 degrees from vertical in a direction opposite the first direction; and
the docking connector is configured to rotate in the first direction for a predetermined angular rotation from the neutral pivot position before the ejector pushes the electronic device at least partially off the docking connector.

15. A method of providing a charging stand, the method comprising:
providing a connector base;
providing a docking connector pivotally coupled to the connector base and configured to be removably coupled to an electronic device;

providing an ejector at least partially surrounding the docking connector and configured to push the electronic device at least partially off the docking connector when the docking connector is rotated in a first direction relative to the connector base; and providing the ejector comprises providing the ejector such that the ejector comprises:
- a sleeve at least partially surrounding the docking connector; and
- a tab extending from the sleeve to a first point of the connector base and being slidable with respect to the first point of the connector base such that the tab slides along the first point of the connector base and pushes the sleeve along the docking connector outward from the connector base as the docking connector is rotated in the first direction with respect to the connector base.

16. The method of claim 15, wherein:

the connector base comprises a slot at the first point of the connector base; and the tab is configured to slide through the slot as the docking connector is rotated in the first direction with respect to the connector base.

17. The method of claim 15 further comprising:

providing a casing, the casing comprising a surface, the surface being configured to support a bottom side of the electronic device when the electronic device is coupled to the docking connector, wherein:
- an adjustment mechanism configured to adjust a position of the connector base and docking connector relative to the surface.

18. The method of claim 15 further comprising:

providing a connector cable electrically coupled to the docking connector, the connector cable being configured to pass through a pivot point of the docking connector.

19. The method of claim 15, wherein:

the docking connector has a neutral pivot position at approximately 5 degrees to approximately 20 degrees from vertical in a direction opposite the first direction.

20. The method of claim 19, wherein: the docking connector is configured to rotate in the first direction for a predetermined angular rotation from the neutral pivot position before the ejector pushes the electronic device at least partially off the docking connector.

* * * * *